United States Patent
Yoshimura et al.

(10) Patent No.: US 9,871,985 B2
(45) Date of Patent: Jan. 16, 2018

(54) SOLID-STATE IMAGE PICKUP DEVICE AND ELECTRONIC APPARATUS INCLUDING A SOLID-STATE IMAGE PICKUP DEVICE HAVING HIGH AND LOW SENSITIVITY PIXELS

(71) Applicant: SONY SEMICONDUCTOR SOLUTIONS CORPORATION, Kanagawa (JP)

(72) Inventors: Kyohei Yoshimura, Kanagawa (JP); Atsushi Masagaki, Kanagawa (JP); Ikuo Yoshihara, Kanagawa (JP); Ryoji Suzuki, Kanagawa (JP); Takashi Machida, Tokyo (JP); Shinichiro Izawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 42 days.

(21) Appl. No.: 14/904,779

(22) PCT Filed: Jul. 8, 2014

(86) PCT No.: PCT/JP2014/068127
§ 371 (c)(1),
(2) Date: Jan. 13, 2016

(87) PCT Pub. No.: WO2015/012098
PCT Pub. Date: Jan. 29, 2015

(65) Prior Publication Data
US 2016/0156862 A1    Jun. 2, 2016

(30) Foreign Application Priority Data
Jul. 22, 2013 (JP) ................... 2013-151666

(51) Int. Cl.
*H04N 5/374* (2011.01)
*H04N 5/355* (2011.01)
*H04N 5/378* (2011.01)

(52) U.S. Cl.
CPC ......... *H04N 5/374* (2013.01); *H04N 5/35563* (2013.01); *H04N 5/378* (2013.01)

(58) Field of Classification Search
CPC ..... H04N 5/374; H04N 5/35563; H04N 5/378
See application file for complete search history.

(56) References Cited

U.S. PATENT DOCUMENTS 5,965,875 A * 10/1999 Merrill ............. H01L 27/14623
250/208.1
6,934,050 B2 * 8/2005 Merrill ............. H01L 27/14647
250/208.1

(Continued)

FOREIGN PATENT DOCUMENTS

JP    2005-086082         3/2005
JP    2005-332880 A      12/2005

(Continued)

OTHER PUBLICATIONS

International Search Report prepared by the Japanese Patent Office dated Aug. 18, 2014, for International Application No. PCT/JP2014/068127.

*Primary Examiner* — Nicholas Giles
(74) *Attorney, Agent, or Firm* — Sheridan Ross P.C.

(57) ABSTRACT

The present disclosure relates to a solid-state image pickup device and an electronic apparatus capable of generating highly-accurate image pickup signals having a large dynamic range.
Pixels each include a high-sensitivity pixel and a low-sensitivity pixel having a lower sensitivity than the high-sensitivity pixel. A control gate controls a potential of a photoelectric conversion device of the low-sensitivity pixel.

(Continued)

|  | When accumulating charges | When transferring charges |
|---|---|---|
| Control gate 211 | High | Low |
| Trance gate 301 | Low | Low |
| Trance gate 136-1, 232 | Low | High |

The present disclosure is applicable to, for example, a CMOS image sensor that includes both the high-sensitivity pixel and the low-sensitivity pixel having a lower sensitivity than the high-sensitivity pixel and controls a potential of the photoelectric conversion device of the low-sensitivity pixel.

18 Claims, 15 Drawing Sheets

(56) References Cited

U.S. PATENT DOCUMENTS

| | | | |
|---|---|---|---|
| 7,965,326 B2* | 6/2011 | Furuta | H04N 5/2355 348/294 |
| 2002/0171881 A1* | 11/2002 | Merrill | H01L 27/14647 358/513 |
| 2003/0193586 A1* | 10/2003 | Hayakawa | H04N 5/335 348/272 |
| 2005/0127414 A1* | 6/2005 | Andersson | H01L 27/14603 257/291 |
| 2008/0088723 A1* | 4/2008 | Furuta | H04N 9/045 348/294 |

FOREIGN PATENT DOCUMENTS

| | | |
|---|---|---|
| JP | 2006-121617 A | 5/2006 |
| JP | 2007-258684 A | 10/2007 |
| JP | 2007-266556 A | 10/2007 |
| JP | 2008-91437 A | 4/2008 |
| JP | 2009-4583 A | 1/2009 |
| JP | 2010-267709 A | 11/2010 |
| JP | 2011-129638 | 6/2011 |
| JP | 2011-188148 | 9/2011 |

* cited by examiner

| | When accumulating charges | When transferring charges |
|---|---|---|
| Control gate 211 | High | Low |
| Trance gate 136-1 | Low | High |

| | When accumulating charges | When transferring charges |
|---|---|---|
| Control gate 211 | High | Low |
| Trance gate 301 | Low | Low |
| Trance gate 136-1, 232 | Low | High |

| Structure | Dark current | Number of saturated electrons | Blue sensitivity |
|---|---|---|---|
| No control gate | ○ | △ | ○ |
| With control gate in entire pixels in front-irradiation type | △ | ○ | △ |
| With control gate in entire pixels in back-irradiation type | △ | ○ | ○ |
| Second embodiment | ○ | ○ | ○ |

SOLID-STATE IMAGE PICKUP DEVICE AND ELECTRONIC APPARATUS INCLUDING A SOLID-STATE IMAGE PICKUP DEVICE HAVING HIGH AND LOW SENSITIVITY PIXELS

CROSS REFERENCE TO RELATED APPLICATIONS

This application is a national stage application under 35 U.S.C. 371 and claims the benefit of PCT Application No. PCT/JP2014/068127 having an international filing date of Jul. 8, 2014, which designated the United States, which PCT application claimed the benefit of Japanese Patent Application No. 2013-151666 filed Jul. 22, 2013, the disclosures of which are incorporated herein by reference in their entirety.

TECHNICAL FIELD

The present disclosure relates to a solid-state image pickup device and an electronic apparatus, more specifically, to a solid-state image pickup device and an electronic apparatus capable of generating highly-accurate image pickup signals having a large dynamic range.

BACKGROUND ART

Solid-state image pickup devices are used in, for example, image pickup apparatuses such as a digital still camera and a video camera and electronic apparatuses such as a mobile terminal apparatus having an image pickup function. As the solid-state image pickup device, there is a CMOS (Complementary Metal Oxide Semiconductor) image sensor that reads out, via a MOS transistor, charges accumulated in a photodiode as a photoelectric conversion device.

In the CMOS image sensor, it is desirable for the sensitivity to be high so that image pickup signals can be acquired even at a time of a low luminance. Moreover, since the dynamic range becomes large, it is desirable for the photodiode to be difficult to be saturated.

However, the high sensitivity and the photodiode being difficult to be saturated are in a tradeoff relationship, and it is difficult to enlarge the dynamic range while maintaining a high sensitivity.

In this regard, there is proposed a CMOS image sensor that includes both high-sensitivity pixels and low-sensitivity pixels and enlarges, while maintaining a high sensitivity by the high-sensitivity pixels, a dynamic range by the low-sensitivity pixels (see, for example, Patent Documents 1 to 3).

In the CMOS image sensor disclosed in Patent Document 1, since the aperture of the photodiodes of the high-sensitivity pixels is small, it is difficult to collect light, and the sensitivity is therefore lowered. In addition, since the capacity of the photodiodes of the high-sensitivity pixels is small, the photodiodes are apt to be saturated. If the photodiodes of the high-sensitivity pixels are saturated rapidly, image pickup signals of a poor S/N ratio obtained from the low-sensitivity pixels at the time of a low luminance are used, and an accuracy of the image pickup signals is therefore lowered.

In the CMOS image sensor disclosed in Patent Document 2, for preventing crosstalk and enhancing sensitivities, the photodiodes of the high-sensitivity pixels are set to be large, and the photodiodes of the low-sensitivity pixels are set to be small. Therefore, the low-sensitivity pixels are apt to be saturated, and the dynamic range cannot be enlarged sufficiently.

In the CMOS image sensor disclosed in Patent Document 3, since the capacity of the photodiodes of the low-sensitivity pixels is small, the low-sensitivity pixels are apt to be saturated, and the dynamic range cannot be enlarged sufficiently.

Patent Document 1: Japanese Patent Application Laid-open No. 2011-188148
Patent Document 2: Japanese Patent Application Laid-open No. 2011-129638
Patent Document 3: Japanese Patent Application Laid-open No. 2005-86082

SUMMARY OF INVENTION

Problem to be Solved by the Invention

As described above, if the aperture of the photodiodes of the high-sensitivity pixels is small, the accuracy of the image pickup signals is lowered. Moreover, if the aperture of the photodiodes of the high-sensitivity pixels is large, the photodiodes of the low-sensitivity pixels become small, and the dynamic range cannot be enlarged efficiently.

Therefore, a CMOS image sensor that includes high-sensitivity pixels and low-sensitivity pixels and generates highly-accurate image pickup signals having a large dynamic range is desired.

The present disclosure has been made in view of the circumstances as described above and aims at enabling highly-accurate image pickup signals having a large dynamic range to be generated.

Means for Solving the Problem

According to a first aspect of the present disclosure, there is provided a solid-state image pickup device, including: pixels each including a high-sensitivity pixel and a low-sensitivity pixel having a lower sensitivity than the high-sensitivity pixel; and a low-sensitivity pixel control gate configured to control a potential of a photoelectric conversion device of the low-sensitivity pixel.

An electronic apparatus according to the first aspect of the present disclosure corresponds to the solid-state image pickup device according to the first aspect of the present disclosure.

In the first aspect of the present disclosure, the solid-state image pickup device includes the pixels each including the high-sensitivity pixel and the low-sensitivity pixel having a lower sensitivity than the high-sensitivity pixel and the low-sensitivity pixel control gate configured to control a potential of a photoelectric conversion device of the low-sensitivity pixel.

According to a second aspect of the present disclosure, there is provided a solid-state image pickup device, including pixels each including a high-sensitivity pixel and a low-sensitivity pixel having a lower sensitivity than the high-sensitivity pixel, a potential deep section of a photoelectric conversion device of the low-sensitivity pixel extending in a horizontal direction outside a photoelectric conversion device of the high-sensitivity pixel.

An electronic apparatus according to the second aspect of the present disclosure corresponds to the solid-state image pickup device according to the second aspect of the present disclosure.

In the second aspect of the present disclosure, the solid-state image pickup device includes the pixels each including the high-sensitivity pixel and the low-sensitivity pixel having a lower sensitivity than the high-sensitivity pixel, and the potential deep section of the photoelectric conversion device of the low-sensitivity pixel extends in the horizontal direction outside the photoelectric conversion device of the high-sensitivity pixel.

According to a third aspect of the present disclosure, there is provided a solid-state image pickup device, including pixels each including a high-sensitivity pixel and a low-sensitivity pixel having a lower sensitivity than the high-sensitivity pixel, an electric field of the photoelectric conversion device of the low-sensitivity pixel being stronger than that of the photoelectric conversion device of the high-sensitivity pixel.

An electronic apparatus according to the third aspect of the present disclosure corresponds to the solid-state image pickup device according to the third aspect of the present disclosure.

In the third aspect of the present disclosure, the solid-state image pickup device includes the pixels each including the high-sensitivity pixel and the low-sensitivity pixel having a lower sensitivity than the high-sensitivity pixel, and the electric field of the photoelectric conversion device of the low-sensitivity pixel is stronger than that of the photoelectric conversion device of the high-sensitivity pixel.

Effect of the Invention

According to the first to third aspects of the present disclosure, highly-accurate image pickup signals having a large dynamic range can be generated.

MODES FOR CARRYING OUT THE INVENTION

First Embodiment (Structural Example of Solid-State Image Pickup Device According to First Embodiment)

Figure 1:
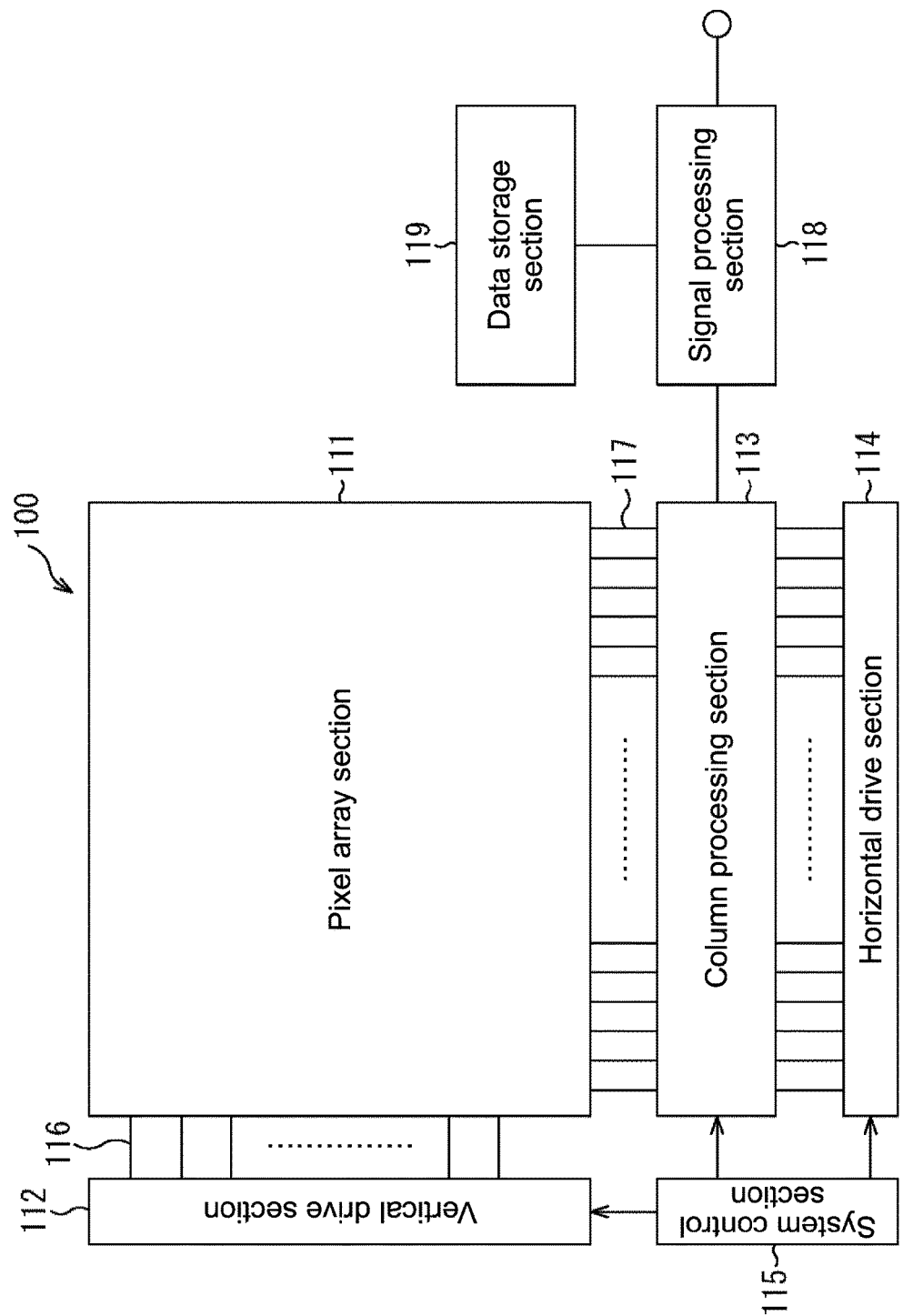
FIG. 1 A block diagram showing a structural example of a CMOS image sensor as a solid-state image pickup device according to a first embodiment to which the present disclosure is applied.

FIG. 1 is a block diagram showing a structural example of a CMOS image sensor as a solid-state image pickup device according to a first embodiment to which the present disclosure is applied.

The CMOS image sensor 100 is constituted of a pixel array section 111, a vertical drive section 112, a column processing section 113, a horizontal drive section 114, a system control section 115, pixel drive lines 116, vertical signal lines 117, a signal processing section 118, and a data storage section 119.

The pixel array section 111, the vertical drive section 112, the column processing section 113, the horizontal drive section 114, the system control section 115, the pixel drive lines 116, the vertical signal lines 117, the signal processing section 118, and the data storage section 119 are formed on a semiconductor substrate (not shown).

It should be noted that it is also possible for the CMOS image sensor 100 to not include the signal processing section 118 and the data storage section 119, and the signal processing section 118 and the data storage section 119 may be provided on a substrate different from the CMOS image sensor 100 as an external signal processing section such as a DSP (Digital Signal Processor), for example.

The CMOS image sensor 100 picks up an image of an object and outputs image pickup signals of pixels in the image.

Specifically, a plurality of pixels are 2-dimensionally arranged in a matrix in the pixel array section 111. The pixels are constituted of high-sensitivity pixels including a photodiode as a photoelectric conversion device that accumulates therein charges in a charge amount corresponding to a light amount of incident light and low-sensitivity pixels that include a photodiode and has a lower sensitivity than the high-sensitivity pixels.

Also in the pixel array section 111, the pixel drive lines 116 are each provided laterally (row direction) in the figure for each row with respect to the pixels arranged in a matrix, and the vertical signal lines 117 are each provided longitudinally (column direction) in the figure for each column. One end of each of the pixel drive lines 116 is connected to an output terminal (not shown) of the vertical drive section 112 corresponding to each row.

The vertical drive section 112 is a pixel drive section that is constituted of a shift resistor, an address decoder, and the like and drives the pixels of the pixel array section 111 in a row unit or the like. Although the specific structure of the vertical drive section 112 is not illustrated in the figure, the vertical drive section 112 includes two scan systems, that is, a readout scan system and a flushing scan system.

The readout scan system sequentially selects each row to sequentially read out image pickup signals from the pixels in a row unit and outputs a transfer pulse, a selection pulse, and the like from the output terminal connected to the pixel drive line 116 of the selected row.

The flushing scan system outputs, for flushing (resetting) unnecessary charges from the photoelectric conversion device, a control pulse from the output terminal connected to the pixel drive line 116 of the selected row while preceding the scan of the read out scan system only by a time corresponding to a shutter speed. By the scan of the flushing scan system, a so-called electronic shutter operation is carried out sequentially for each row. Here, the electronic shutter operation refers to an operation of discharging the charges of the photoelectric conversion device and newly starting an exposure (starting accumulating charges).

The image pickup signals output from the pixels in the row selected by the readout scan system of the vertical drive section 112 are supplied to the column processing section 113 via the vertical signal lines 117.

The column processing section 113 includes a signal processing circuit for each column of the pixel array section 111. Each signal processing circuit of the column processing section 113 carries out signal processing such as noise removal processing including CDS (Correlated Double Sampling) processing, A/D conversion processing, and color correction processing on the image pickup signals output from the pixels of the selected row via the vertical signal lines 117. By the CDS processing, fixed pattern noises unique to the pixels, such as reset noises and threshold variations of an amplification transistor, are removed.

Each of the signal processing circuits temporarily stores image pickup signals of the high-sensitivity pixels subjected to the signal processing as image pickup signals in pixel units at a time of a low luminance and temporarily stores image pickup signals of the low-sensitivity pixels subjected to the signal processing as image pickup signals in the pixel units at a time of a high luminance.

The horizontal drive section 114 is constituted of a shift resistor, an address decoder, and the like and sequentially selects the signal processing circuits of the column processing section 113. By the selective scan of the horizontal drive section 114, the image pickup signals subjected to the signal processing by the signal processing circuits of the column processing section 113 are sequentially output to the signal processing section 118.

The system control section 115 is constituted of a timing generator that generates various timing signals, and the like and controls the vertical drive section 112, the column processing section 113, and the horizontal drive section 114 based on the various timing signals generated by the timing generator.

The signal processing section 118 includes at least an addition processing function. The signal processing section 118 carries out various types of signal processing such as addition processing on the image pickup signals output from the column processing section 113. At this time, the signal processing section 118 stores mid-processing results of the signal processing and the like in the data storage section 119 as necessary and references them at necessary timings. The signal processing section 118 outputs the image pickup signals subjected to the signal processing.

(First Structural Example of Pixels)

Figure 2:
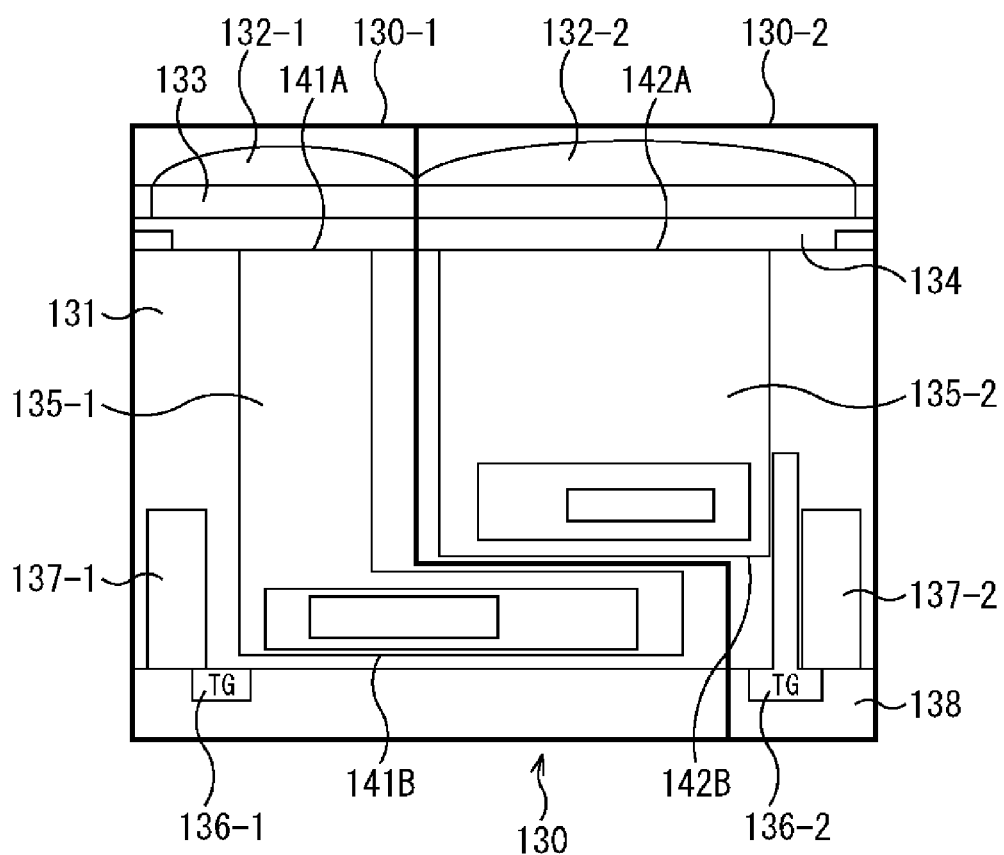
FIG. 2 A cross-sectional diagram showing a first structural example of pixels arranged in a pixel array section shown in FIG. 1.

FIG. 2 is a cross-sectional diagram showing a first structural example of the pixels arranged in the pixel array section 111 shown in FIG. 1.

As shown in FIG. 2, a pixel 130 is constituted of a low-sensitivity pixel 130-1 and a high-sensitivity pixel 130-2. The low-sensitivity pixel 130-1 is constituted of an on-chip lens 132-1, a color filter 133, a flattening film 134, a photodiode 135-1, a trance gate 136-1, and a charge voltage conversion section 137-1.

Further, the high-sensitivity pixel 130-2 is constituted of an on-chip lens 132-2, the color filter 133, the flattening film 134, a photodiode 135-2, a trance gate 136-2, and a charge voltage conversion section 137-2.

In the example shown in FIG. 2, the CMOS image sensor 100 is a back-irradiation type CMOS image sensor. Therefore, in the pixel 130, the on-chip lenses 132-1 and 132-2, the color filter 133, and the flattening film 134 are arranged on a back surface side of a semiconductor substrate 131. Moreover, a circuit 138 including the trance gates (TGs) 136-1 and 136-2, the pixel drive lines 116, and the vertical signal lines 117 is arranged on a front surface side of the semiconductor substrate 131.

It should be noted that the front surface side of the semiconductor substrate 131 is a side on which the circuit is arranged, and the back surface side is the other side of the side on which the circuit is arranged.

The on-chip lens 132-1 of the low-sensitivity pixel 130-1 is smaller than the on-chip lens 132-2 of the high-sensitivity pixel 130-2. The on-chip lens 132-1 collects incident light on the photodiode 135-1 on the semiconductor substrate 131 via the color filter 133 and the flattening film 134.

The on-chip lens 132-2 of the high-sensitivity pixel 130-2 collects incident light on the photodiode 135-2 on the semiconductor substrate 131 via the color filter 133 and the flattening film 134.

The color filter 133 emits light of a predetermined color out of light that has entered via the on-chip lenses 132-1 and 132-2 to the semiconductor substrate 131 via the flattening film 134. In the CMOS image sensor 100, the pixels are arranged in a Bayer arrangement, and the color filter 133 emits red (R), green (Gb, Gr), or blue (B) light.

A potential deep section of the photodiode 135-1 of the low-sensitivity pixel 130-1 extends in a horizontal direction on the front surface side of the photodiode 135-2 and forms an L-shape. Therefore, an aperture 141B of the photodiode 135-1 on the front surface side is larger than an aperture 141A on the back surface side.

As described above, by extending the potential deep section of the photodiode 135-1 in the horizontal direction, a capacity of the photodiode 135-1 can be enlarged as compared to an I-shaped photodiode whose potential deep section does not extend in the horizontal direction. Accordingly, the dynamic range of the image pickup signals is enlarged.

Further, since only the potential deep section of the photodiode 135-1 extends in the horizontal direction, the aperture of the photodiode 135-2 does not need to be made small. Therefore, it is possible to prevent an accuracy of the image pickup signals from lowering due to lowering of a sensitivity induced by the photodiode of the high-sensitivity pixel. Moreover, the depth of the photodiode 135-2 does not need to be changed. As a result, it is possible to prevent an accuracy of the image pickup signals from lowering due to the photodiode of the high-sensitivity pixel being saturated.

On the other hand, since a part of the photodiode 135-1 is positioned on the front surface side of the photodiode 135-2, light that has transmitted without being photoelectrically converted by the photodiode 135-2 enters the photodiode 135-1 to be photoelectrically converted in some cases. However, since the colors of light that enter the photodiode 135-1 and the photodiode 135-2 are the same, no big problem arises.

Further, since the photodiode 135-1 is partially positioned below the photodiode 135-2, spectral characteristics of the photodiode 135-1 and the photodiode 135-2 differ. Therefore, by differentiating a linear matrix used in the color correction processing on the image pickup signal of the low-sensitivity pixel 130-1 from that used in the color correction processing on the image pickup signal of the high-sensitivity pixel 130-2, color reproducibility can be improved.

In this case, as the linear matrix of the low-sensitivity pixel 130-1, a linear matrix determined based on the incident light and image pickup signal obtained from the low-sensitivity pixel 130-1 is used. Moreover, as the linear matrix of the high-sensitivity pixel 130-2, a linear matrix determined based on the incident light and image pickup signal obtained from the high-sensitivity pixel 130-2 is used.

Further, when blue light enters the photodiode 135-2, all the light that has entered the photodiode 135-2 is photoelectrically converted by the photodiode 135-2. Therefore, a sensitivity ratio of the low-sensitivity pixel 130-1 and the high-sensitivity pixel 130-2 becomes an area ratio of the on-chip lens 132-1 and the on-chip lens 132-2.

However, when red or green light enters the photodiode 135-2, part of the light that has entered the photodiode 135-2 is transmitted through the photodiode 135-2 to be photoelectrically converted by the photodiode 135-1. Therefore, the sensitivity ratio of the low-sensitivity pixel 130-1 and the high-sensitivity pixel 130-2 does not become the area ratio of the on-chip lens 132-1 and the on-chip lens 132-2. As a result, by differentiating the linear matrix for each color, the ratio of the image pickup signals of the respective colors can be made the same for the low-sensitivity pixel 130-1 and the high-sensitivity pixel 130-2.

The photodiode 135-1 generates and accumulates therein charges in a charge amount corresponding to a light amount of predetermined color light that has entered from the on-chip lens 132-1 via the color filter 133 and the flattening film 134. The charges accumulated in the photodiode 135-1 are transferred to the charge voltage conversion section 137-1 under control of the trance gate 136-1.

The photodiode 135-2 of the high-sensitivity pixel 130-2 is an I-shaped photodiode. Therefore, an aperture 142A of the photodiode 135-2 on the back surface side and an aperture 142B thereof on the front surface side are the same. In addition, the aperture 142A is larger than the aperture 141A of the photodiode 135-1 on the back surface side.

The photodiode 135-2 generates and accumulates therein charges in a charge amount corresponding to a light amount of predetermined color light that has entered from the on-chip lens 132-2 via the color filter 133 and the flattening film 134. The charges accumulated in the photodiode 135-2 are transferred to the charge voltage conversion section 137-2 under control of the trance gate 136-2.

The trance gate 136-1 of the low-sensitivity pixel 130-1 transfers the charges accumulated in the photodiode 135-1 to the charge voltage conversion section 137-1 according to transfer pulses supplied from the readout scan system of the vertical drive section 112 shown in FIG. 1 via the pixel drive lines 116. The charge voltage conversion section 137-1 converts the charges transferred from the photodiode 135-1 into voltages.

The trance gate 136-2 of the high-sensitivity pixel 130-2 transfers the charges accumulated in the photodiode 135-2 to the charge voltage conversion section 137-2 according to transfer pulses supplied from the readout scan system of the vertical drive section 112 via the pixel drive lines 116. Since the trance gate 136-2 is embedded into the semiconductor substrate 131, the charges can be transferred from the photodiode 135-2 not present on the front surface side. The charge voltage conversion section 137-2 converts the charges transferred from the photodiode 135-2 into voltages.

The voltage signals obtained by the conversions of the charge voltage conversion section 137-1 and the charge voltage conversion section 137-2 are supplied to the column processing section 113 shown in FIG. 1 as image pickup signals according to selection pulses supplied from the readout scan system of the vertical drive section 112 via the pixel drive lines 116.

(Second Structural Example of Pixels)

Figure 3:
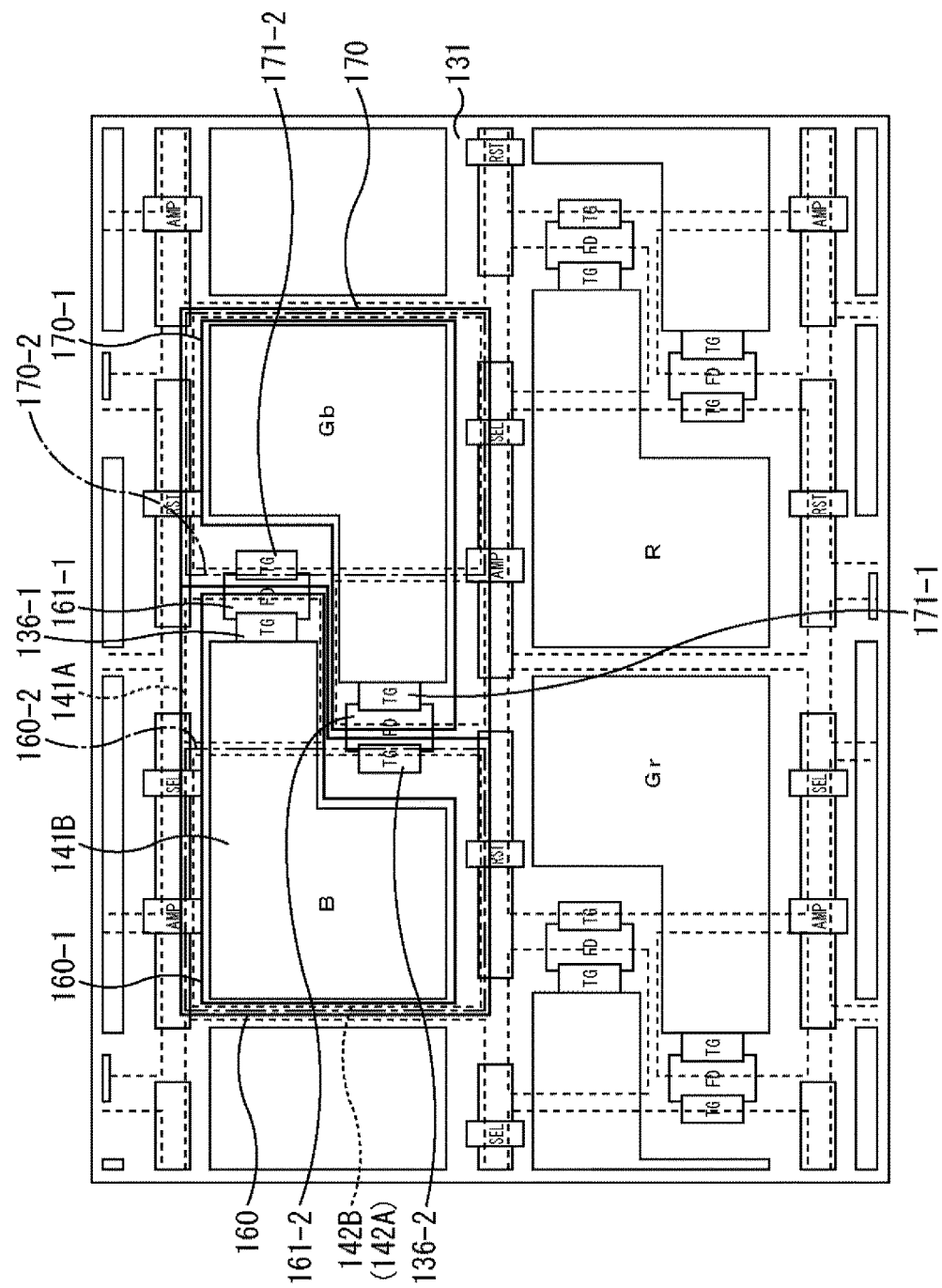
FIG. 3 A plan view showing a second structural example of the pixels arranged in the pixel array section shown in FIG. 1.

FIG. 3 is a plan view showing a second structural example of the pixels arranged in the pixel array section 111 shown in FIG. 1, the view obtained by viewing the semiconductor substrate 131 from the front surface side.

Of the structures shown in FIG. 3, structures that are the same as those shown in FIG. 2 are denoted by the same symbols, and overlapping descriptions will be omitted as appropriate.

The pixel 160 shown in FIG. 3 is different from the pixel 130 shown in FIG. 2 in that a charge voltage conversion section 161-1 and a charge voltage conversion section 161-2 are provided in place of the charge voltage conversion section 137-1 and the charge voltage conversion section 137-2. In the pixel 160, the charge voltage conversion section 161-1 and the charge voltage conversion section 161-2 are shared with an adjacent pixel 170.

Specifically, the pixel 160 is constituted of a low-sensitivity pixel 160-1 and a high-sensitivity pixel 160-2. The charge voltage conversion section 161-1 of the low-sensitivity pixel 160-1 converts charges transferred from the photodiode 135-1 of the pixel 160 via the trance gate 136-1 into voltages. Moreover, the charge voltage conversion section 161-1 converts, into voltages, charges of a high-sensitivity pixel 170-2 of the pixel 170 adjacent to the pixel 160 in the horizontal direction, that are transferred by a trance gate 171-2 embedded into the semiconductor substrate 131 of the high-sensitivity pixel 170-2. The voltage signals obtained by the conversion are supplied to the column processing section 113 as image pickup signals according to selection pulses supplied from the readout scan system of the vertical drive section 112 via the pixel drive lines 116.

Further, the charge voltage conversion section 161-2 of the high-sensitivity pixel 160-2 converts charges transferred from the photodiode 135-2 of the pixel 160 via the trance gate 136-2 into voltages. Moreover, the charge voltage conversion section 161-2 converts, into voltages, charges of a low-sensitivity pixel 170-1, that are transferred by a trance gate 171-1 of the low-sensitivity pixel 170-1. The voltage signals obtained by the conversion are supplied to the column processing section 113 as image pickup signals according to selection pulses supplied from the readout scan system of the vertical drive section 112 via the pixel drive lines 116.

As described above, by sharing the charge voltage conversion section by the adjacent pixels, an area of the charge voltage conversion section in the semiconductor substrate 131 can be cut. As a result, apertures of the photodiodes 135-1 and 135-2 can be made large.

It should be noted that the charge voltage conversion section to be shared is not limited to being provided between one of the high- and low-sensitivity pixels of a pixel and the other one of the high- and low-sensitivity pixels of the adjacent pixel. The charge voltage conversion section within the same pixel may be shared, or the charge voltage conversion section of high-sensitivity pixels and the charge voltage conversion section of low-sensitivity pixels of adjacent pixels may be shared.

(Third Structural Example of Pixels)

Figure 4:
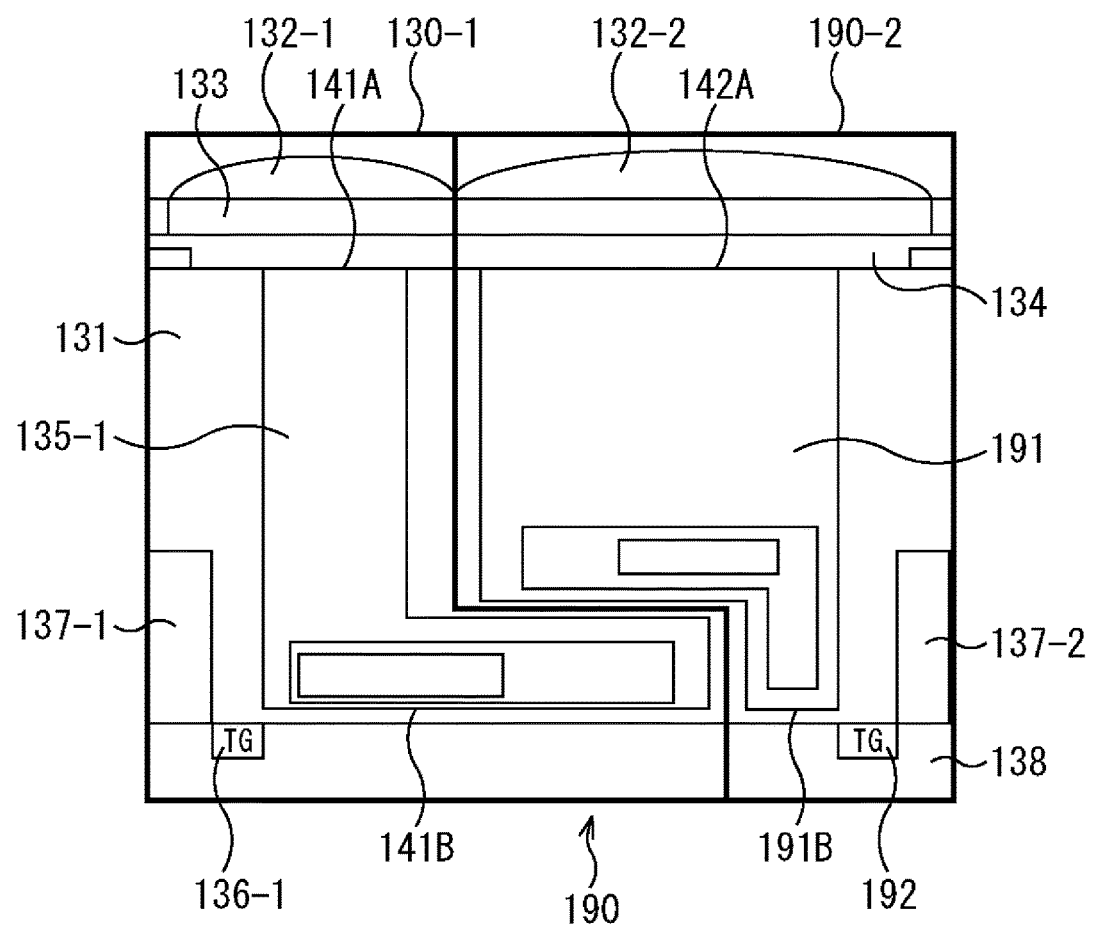
FIG. 4 A cross-sectional diagram showing a third structural example of the pixels arranged in the pixel array section shown in FIG. 1.

FIG. 4 is a cross-sectional diagram showing a third structural example of the pixels arranged in the pixel array section 111 shown in FIG. 1.

Of the structures shown in FIG. 4, structures that are the same as those shown in FIG. 2 are denoted by the same symbols, and overlapping descriptions will be omitted as appropriate.

The structure of the pixel 190 shown in FIG. 4 is different from that of the pixel 130 shown in FIG. 2 in that a photodiode 191 is provided in place of the photodiode 135-2 and a trance gate 192 is provided in place of the trance gate 136-2. In the pixel 190, the trance gate 192 is not embedded into the semiconductor substrate 131 and is provided on a front surface of the semiconductor substrate 131.

Specifically, the pixel 190 is constituted of the low-sensitivity pixel 130-1 and a high-sensitivity pixel 190-2. The photodiode 191 of the high-sensitivity pixel 190-2 partially extends toward the front surface side of the semiconductor substrate 131. Therefore, an aperture 191B on the front surface side of the photodiode 191 is smaller than the aperture 142A on the back surface side. Since the photodiode 191 partially extends toward the front surface side of the semiconductor substrate 131, the charges accumulated in the photodiode 191 can be transferred to the charge voltage conversion section 137-2 without embedding the trance gate 192 into the semiconductor substrate 131.

The trance gate 192 of the high-sensitivity pixel 190-2 transfers the charges accumulated in the photodiode 191 to the charge voltage conversion section 137-2 according to transfer pulses supplied from the readout scan system of the vertical drive section 112 via the pixel drive lines 116.

(Fourth Structural Example of Pixels)

Figures 5, 6:
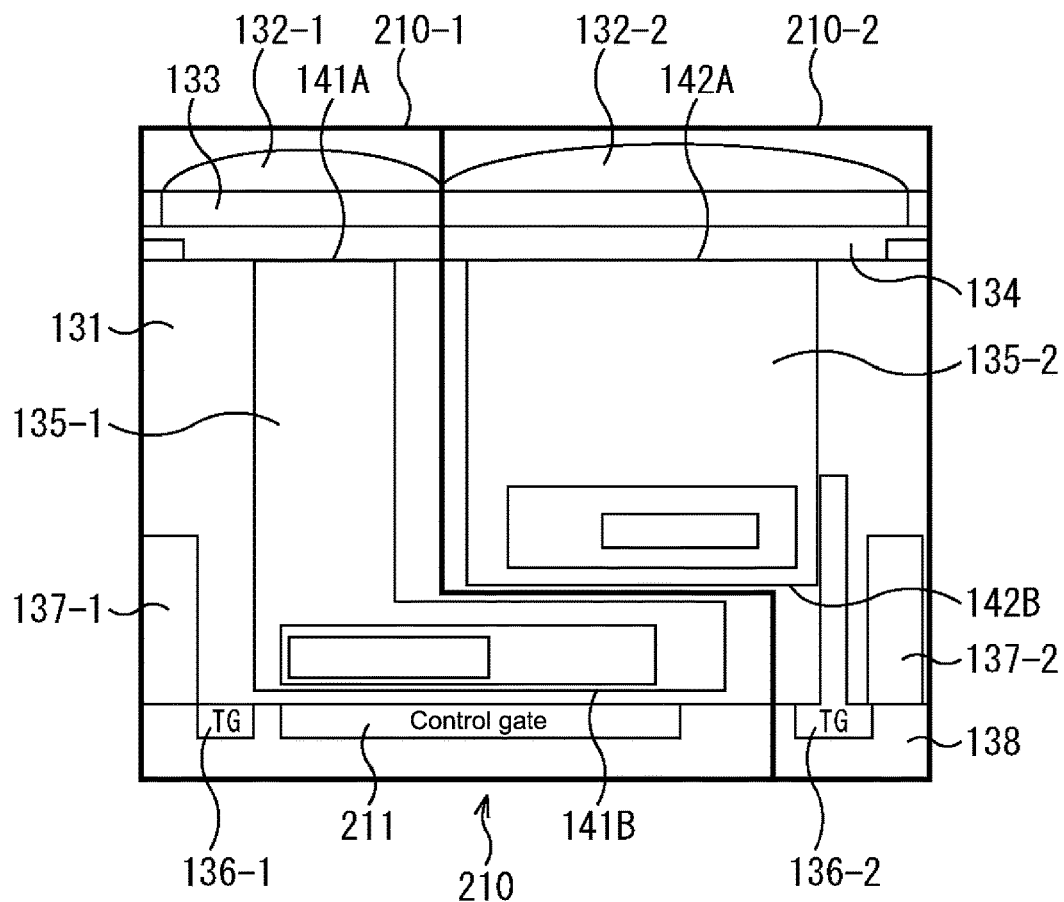
FIG. 5 A cross-sectional diagram showing a fourth structural example of the pixels arranged in the pixel array section shown in FIG. 1.
FIG. 6 A diagram showing an example of control of a control gate and a trance gate.

FIG. 5 is a cross-sectional diagram showing a fourth structural example of the pixels arranged in the pixel array section 111 shown in FIG. 1.

Of the structures shown in FIG. 5, structures that are the same as those shown in FIG. 2 are denoted by the same symbols, and overlapping descriptions will be omitted as appropriate.

The structure of the pixel 210 shown in FIG. 5 is different from that of the pixel 130 shown in FIG. 2 in that a control gate 211 is newly provided. In the pixel 210, the potential deep section of the photodiode 135-1 at the time of accumulating charges is made deeper by the control gate 211.

Specifically, the pixel 210 is constituted of a low-sensitivity pixel 210-1 and the high-sensitivity pixel 130-2. The control gate 211 of the low-sensitivity pixel 210-1 is formed on the front surface of the semiconductor substrate 131 opposing the aperture 141B on the front surface side of the photodiode 135-1. The control gate 211 controls a potential of the photodiode 135-1.

Specifically, as shown in FIG. 6, when charges are accumulated in the photodiode 135-1, the control gate 211 is set to a high level, and the trance gate 136-1 is set to a low level. Accordingly, the potential deep section of the photodiode 135-1 at the time the charges area accumulated becomes deeper.

When the charges of the photodiode 135-1 are transferred, the control gate 211 is set to a low level, and the trance gate 136-1 is set to a high level. Accordingly, flushing of the charges accumulated in the photodiode 135-1 can positively be performed.

(Fifth Structural Example of Pixels)

Figure 7:
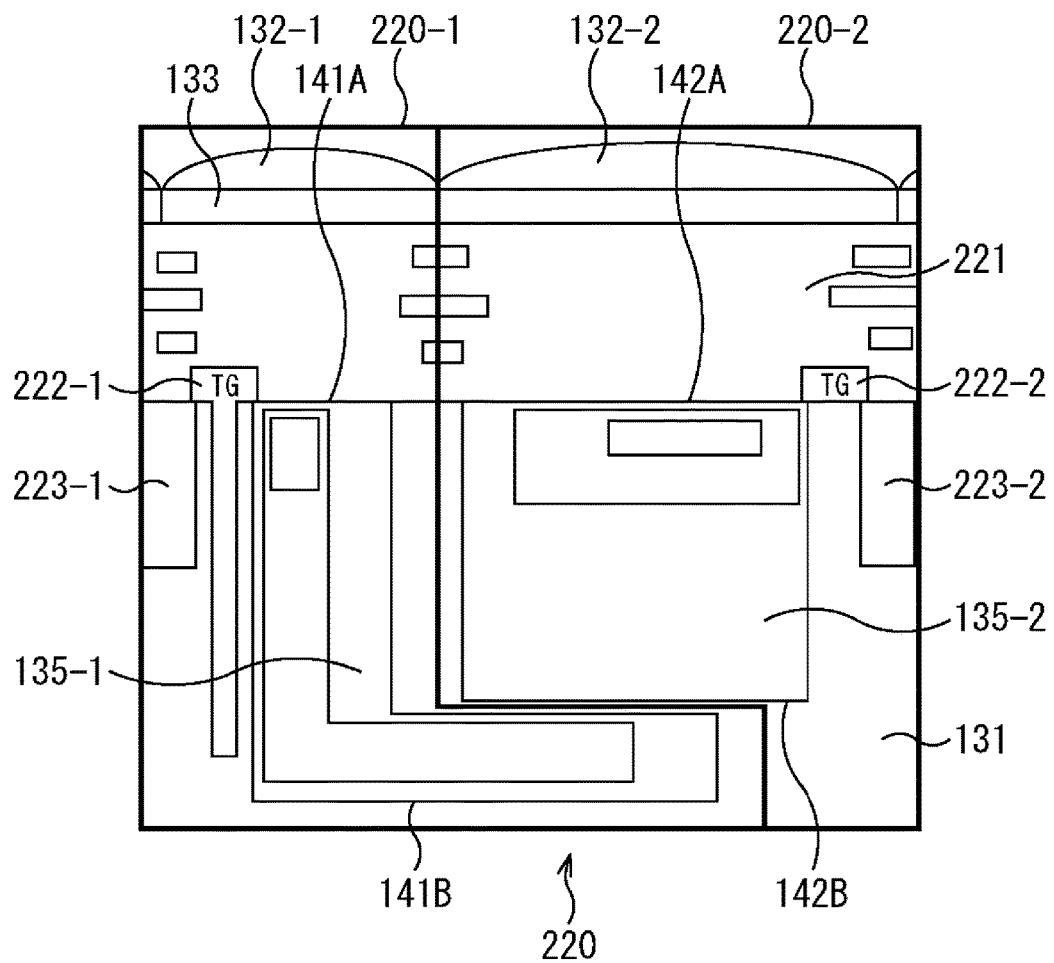
FIG. 7 A cross-sectional diagram showing a fifth structural example of the pixels arranged in the pixel array section shown in FIG. 1.

FIG. 7 is a cross-sectional diagram showing a fifth structural example of the pixels arranged in the pixel array section 111 shown in FIG. 1.

Of the structures shown in FIG. 7, structures that are the same as those shown in FIG. 2 are denoted by the same symbols, and overlapping descriptions will be omitted as appropriate.

The pixel 220 shown in FIG. 7 is constituted of a low-sensitivity pixel 220-1 and a high-sensitivity pixel 220-2. In the example of FIG. 7, the CMOS image sensor 100 is a front-irradiation type CMOS image sensor, and a circuit 221 including the pixel drive lines 116 and the vertical signal lines 117 is provided on the light-incident side of the semiconductor substrate 131 in the pixel 220.

Therefore, a trance gate 222-1 of the low-sensitivity pixel 220-1 is embedded in the semiconductor substrate 131 from the front surface side (circuit 221 side) of the semiconductor substrate 131. Moreover, a charge voltage conversion section 223-1 of the low-sensitivity pixel 220-1 is provided on the front surface side of the semiconductor substrate 131.

Further, a trance gate 222-2 of the high-sensitivity pixel 220-2 is provided on the front surface side of the semiconductor substrate 131. Furthermore, a charge voltage conversion section 223-2 of the high-sensitivity pixel 220-2 is provided on the front surface side of the semiconductor substrate 131.

It should be noted that when the CMOS image sensor 100 is a back-irradiation type CMOS image sensor, the potential deep section of the photodiode 135-1 is closer to the charge voltage conversion section 137-1 (161-1) than in the front-irradiation type CMOS image sensor. Therefore, the charges accumulated in the photodiode 135-1 can be transferred with ease. Also in this case, it is possible to raise an impurity concentration of the potential deep section of the photodiode 135-1 and increase the capacity of the photodiode 135-1.

Description on Effects of First Embodiment

Figure 8:
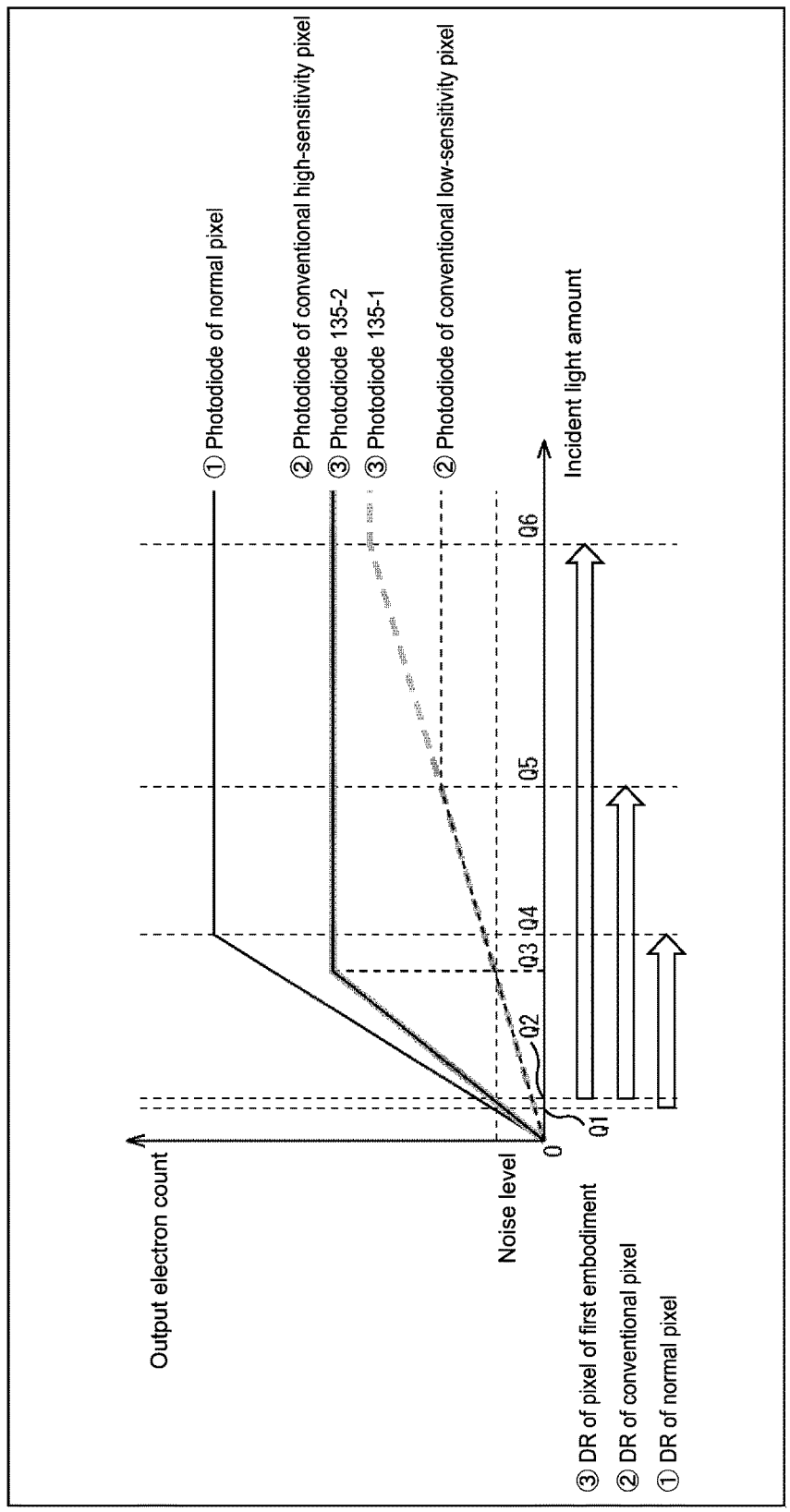
FIG. 8 A diagram for explaining effects of the CMOS image sensor according to the first embodiment.

FIG. 8 is a diagram for explaining effects of the CMOS image sensor 100 according to the first embodiment.

In the graph shown in FIG. 8, the abscissa axis represents a light amount of light that enters the photodiode (incident light amount), and the ordinate axis represents the number of electrons transferred from the photodiode (output electron count).

Here, pixels of a normal CMOS image sensor constituted of pixels having one sensitivity are referred to as normal pixels. Moreover, regarding a conventional CMOS image sensor including high-sensitivity pixels and low-sensitivity pixels, in which a photodiode of the low-sensitivity pixels has a small capacity, the high-sensitivity pixels and the low-sensitivity pixels are referred to as conventional high-sensitivity pixels and conventional low-sensitivity pixels.

As shown in FIG. 8, an output electron count of a photodiode of a normal pixel increases proportional to the incident light amount when the incident light amount is 0 or more and Q4 or less. The photodiode is saturated when the incident light amount reaches Q4, and the output electron count becomes, when the incident light amount is Q4 or more, the output electron count at a time the incident light amount is Q4 irrespective of the incident light amount. Therefore, the dynamic range of the image pickup signals of the normal pixels becomes a range between the incident light amount Q1 where the output electron count exceeds a noise level and the incident light amount Q4 where the photodiode is saturated.

Further, since the conventional CMOS image sensor includes photodiodes of both the low-sensitivity pixels and the high-sensitivity pixels, the size of the photodiodes of the low-sensitivity pixels and the high-sensitivity pixels is smaller than that of normal pixels. Therefore, the photodiode of the conventional high-sensitivity pixel is saturated more rapidly than the photodiode of a normal pixel.

Specifically, the output electron count of the photodiode of the conventional high-sensitivity pixel increases proportional to the incident light amount when the incident light amount is 0 or more and Q3 (Q3<Q4) or less. The photodiode is saturated when the incident light amount reaches Q3, and the output electron count becomes, when the incident light amount is Q3 or more, the output electron count at a time the incident light amount is Q3 irrespective of the incident light amount.

On the other hand, the size of the photodiode of the low-sensitivity pixel is smaller than that of normal pixels, but since the sensitivity is low, the photodiode is saturated slower than that of normal pixels. Specifically, the output electron count of the photodiode of the conventional low-sensitivity pixel increases proportional to the incident light amount when the incident light amount is 0 or more and Q5 (Q5>Q4) or less. The photodiode is saturated when the incident light amount reaches Q5, and the output electron count becomes, when the incident light amount is Q5 or more, the output electron count at a time the incident light amount is Q5 irrespective of the incident light amount.

Therefore, by using the image pickup signals of the low-sensitivity pixels at the time of a high luminance, the dynamic range of the image pickup signals of the pixels becomes a range between the incident light amount Q2 where the output electron count of the high-sensitivity pixels exceeds a noise level and the incident light amount Q5 where the photodiode of the low-sensitivity pixels is saturated.

In contrast, while the output electron count of the photodiode 135-2 (191) of the high-sensitivity pixel is the same as that of the conventional high-sensitivity pixels, the output electron count of the photodiode 135-1 of the low-sensitivity pixel differs from that of the conventional low-sensitivity pixels.

Specifically, since the capacity of the photodiode 135-1 is larger than that of the conventional low-sensitivity pixels, the photodiode 135-1 is saturated when the incident light amount reaches Q6 (Q6>Q5). Therefore, the output electron count of the photodiode 135-1 increases proportional to the incident light amount when the incident light amount is 0 or more and Q6 or less, and the output electron count becomes, when the incident light amount is Q6 or more, the output electron count at a time the incident light amount is Q6.

Therefore, by using the image pickup signals of the photodiode 135-1 at the time of a high luminance, the dynamic range of the image pickup signals of the pixels becomes a range between the incident light amount Q2 where the output electron count of the high-sensitivity pixels exceeds a noise level and the incident light amount Q6 where the photodiode 135-1 is saturated.

As described above, the dynamic range of the image pickup signals in the CMOS image sensor 100 becomes larger than that of a normal CMOS image sensor or the conventional CMOS image sensor.

Second Embodiment (First Structural Example of Pixels of Solid-State Image Pickup Device According to Second Embodiment)

The structure of the CMOS image sensor 100 according to a second embodiment as the solid-state image pickup device to which the present disclosure is applied is the same as that of FIG. 1 except for the structure of pixels 2-dimensionally arranged in the pixel array section 111. Therefore, in the following, only the structure of the pixels will be described.

In the pixel of the CMOS image sensor 100 according to the second embodiment, the capacity of the photodiode of the low-sensitivity pixel is increased by providing a control gate instead of extending the potential deep section of the photodiode of the low-sensitivity pixel in the horizontal direction. With this structure, the capacity of the low-sensitivity pixel can be increased without contracting the aperture of the photodiode of the high-sensitivity pixel. As a result, highly-accurate image pickup signals having a large dynamic range can be generated.

Figure 9:
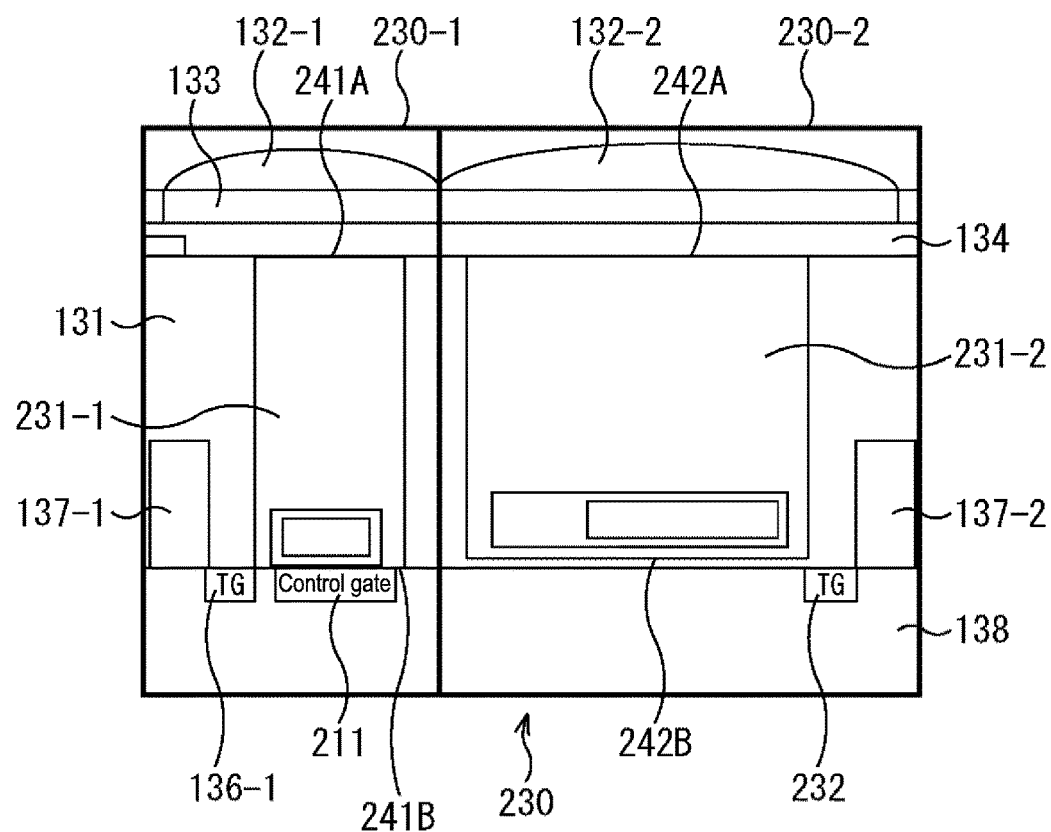
FIG. 9 A cross-sectional diagram showing a first structural example of pixels in the CMOS image sensor according to a second embodiment.

FIG. 9 is a cross-sectional diagram showing a first structural example of the pixels in the CMOS image sensor 100 according to the second embodiment.

Of the structures shown in FIG. 9, structures that are the same as those shown in FIG. 5 are denoted by the same symbols, and overlapping descriptions will be omitted as appropriate.

The structure of the pixel 230 shown in FIG. 9 is different from that of the pixel 210 shown in FIG. 5 in that photodiodes 231-1 and 231-2 and a trance gate 232 are provided in place of the photodiodes 135-1 and 135-2 and the trance gate 136-2. In the pixel 230, the capacity of the photodiode 231-1 is increased by providing the control gate 211.

Specifically, the pixel 230 is constituted of a low-sensitivity pixel 230-1 and a high-sensitivity pixel 230-2. The photodiode 231-1 of the low-sensitivity pixel 230-1 is of an I shape that extends toward the front surface side of the semiconductor substrate 131 from the back surface side. Therefore, a size of an aperture 241A on the back surface side of the photodiode 231-1 and a size of an aperture 241B on the front surface side are the same.

By the control gate 211 formed on the front surface of the semiconductor substrate 131 opposing the aperture 241B formed on the front surface side of the photodiode 231-1, the potential deep section of the photodiode 231-1 at the time charges are accumulated becomes deep. Therefore, the capacity of the photodiode 231-1 increase as compared to the case where the control gate 211 is not formed.

The photodiode 231-1 generates and accumulates therein charges in a charge amount corresponding to a light amount of predetermined color light that has entered from the on-chip lens 132-1 via the color filter 133 and the flattening film 134. The charges accumulated in the photodiode 231-1 are transferred to the charge voltage conversion section 137-1 under control of the trance gate 136-1.

The photodiode 231-2 of the high-sensitivity pixel 230-2 is an I-shaped photodiode. Therefore, an aperture 242A of the photodiode 231-2 on the back surface side and an aperture 242B on the front surface side are the same. Further, the aperture 242A is larger than the aperture 241A of the photodiode 231-1 on the back surface side. Since the photodiode 231-1 does not extend toward the front surface side of the photodiode 231-2, the photodiode 231-2 can extend more on the front surface side than in the first embodiment.

The photodiode 231-2 generates and accumulates therein charges in a charge amount corresponding to a light amount of predetermined color light that has entered from the on-chip lens 132-2 via the color filter 133 and the flattening film 134. The charges accumulated in the photodiode 231-2 are transferred to the charge voltage conversion section 137-2 under control of the trance gate 232.

The trance gate 232 of the high-sensitivity pixel 230-2 transfers the charges accumulated in the photodiode 231-2 to the charge voltage conversion section 137-2 according to transfer pulses supplied from the readout scan system of the vertical drive section 112 via the pixel drive lines 116. Since the photodiode 231-2 extends toward the front surface side, the trance gate 232 does not need to be embedded in the semiconductor substrate 131.

(Second Structural Example of Pixels)

Figure 10:
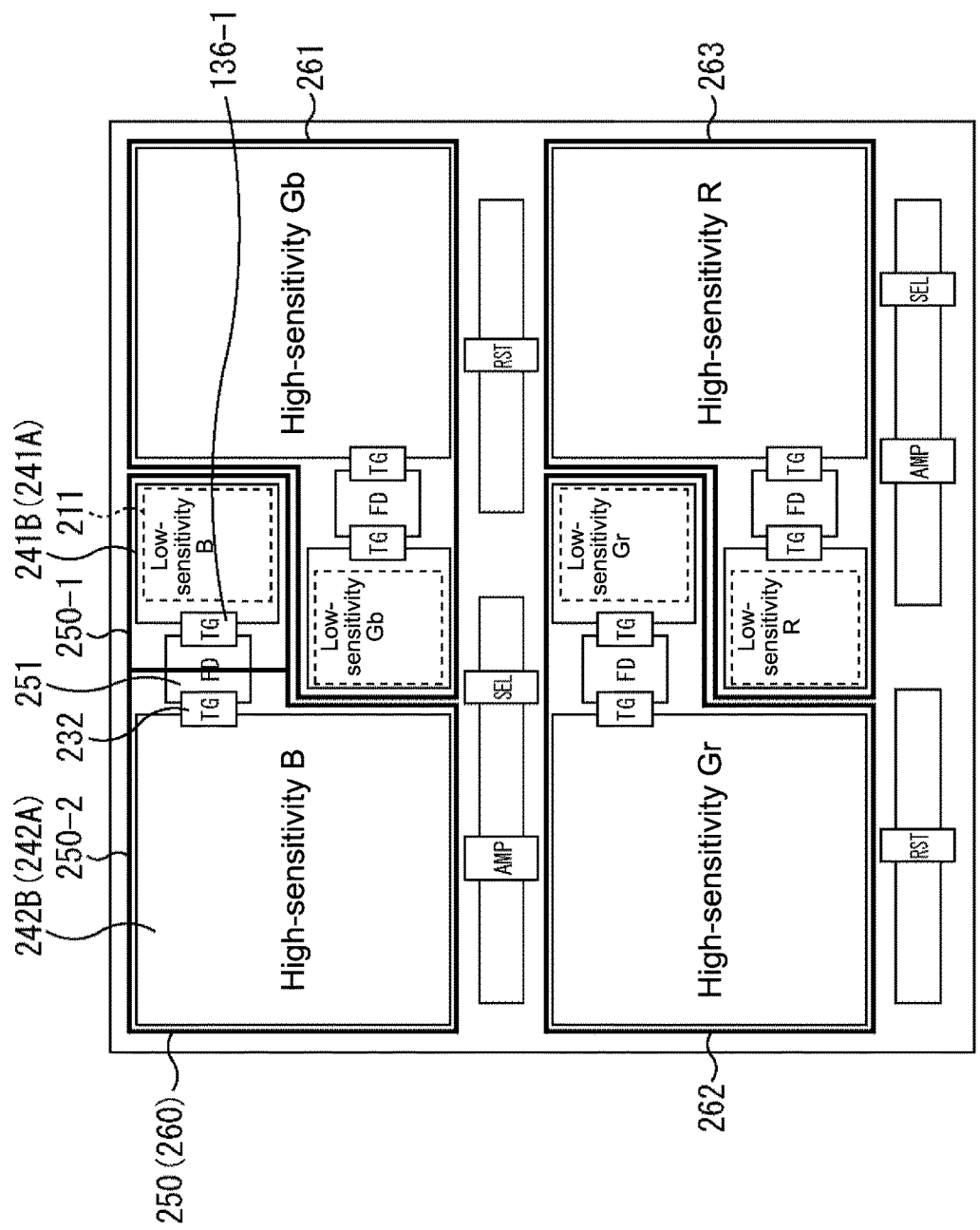
FIG. 10 A plan view showing a second structural example of the pixels in the CMOS image sensor according to the second embodiment.

FIG. 10 is a plan view showing a second structural example of the pixels in the CMOS image sensor 100 according to the second embodiment, the view obtained by viewing the semiconductor substrate 131 from the front surface side.

Of the structures shown in FIG. 10, structures that are the same as those shown in FIG. 9 are denoted by the same symbols, and overlapping descriptions will be omitted as appropriate.

The structure of the pixel 250 shown in FIG. 10 is different from that of the pixel 230 shown in FIG. 9 in that a charge voltage conversion section 251 is provided in place of the charge voltage conversion section 137-1 and the charge voltage conversion section 137-2. In the pixel 250, the charge voltage conversion section 137-1 and the charge voltage conversion section 137-2 in the same pixel 250 are shared as the charge voltage conversion section 251.

Specifically, the pixel 250 is constituted of a low-sensitivity pixel 250-1 and a high-sensitivity pixel 250-2. The charge voltage conversion section 251 converts charges transferred from the photodiode 231-1 of the low-sensitivity pixel 250-1 via the trance gate 136-1 into voltages. The charge voltage conversion section 251 also converts charges transferred from the photodiode 231-2 of the high-sensitivity pixel 250-2 via the trance gate 232 into voltages. The voltage signals obtained by the conversion are supplied to the column processing section 113 as image pickup signals according to selection pulses supplied from the readout scan system of the vertical drive section 112 via the pixel drive lines 116.

By sharing the charge voltage conversion section within the same pixel as described above, the area of the charge voltage conversion section in the semiconductor substrate 131 can be cut. As a result, apertures of the photodiodes 231-1 and 231-2 can be largely secured.

It should be noted that the charge voltage conversion section to be shared is not limited to being shared within the same pixel. A charge voltage conversion section of one of a high-sensitivity pixel and a low-sensitivity pixel of a certain pixel and a charge voltage conversion section of the other one of the high-sensitivity pixel and the low-sensitivity pixel of the adjacent pixel may be shared, or the charge voltage conversion section of high-sensitivity pixels and the charge voltage conversion section of low-sensitivity pixels of adjacent pixels may be shared.

Further, since the pixels are arranged in the Bayer arrangement in the CMOS image sensor 100, the upper left pixel 250 shown in FIG. 10 is a blue pixel that picks up blue (B) light, and the upper right pixel 250 is a green pixel that picks up green (Gb) light. Moreover, the lower left pixel 250 is a green pixel that picks up green (Gr) light, and the lower right pixel 250 is a red pixel that picks up red (R) light.

In the descriptions below, the upper left pixel 250 is also referred to as blue pixel 260, the upper right pixel 250 is also referred to as green pixel 261, the lower left pixel 250 is also referred to as green pixel 262, and the lower right pixel 250 is also referred to as red pixel 263.

Figure 11:
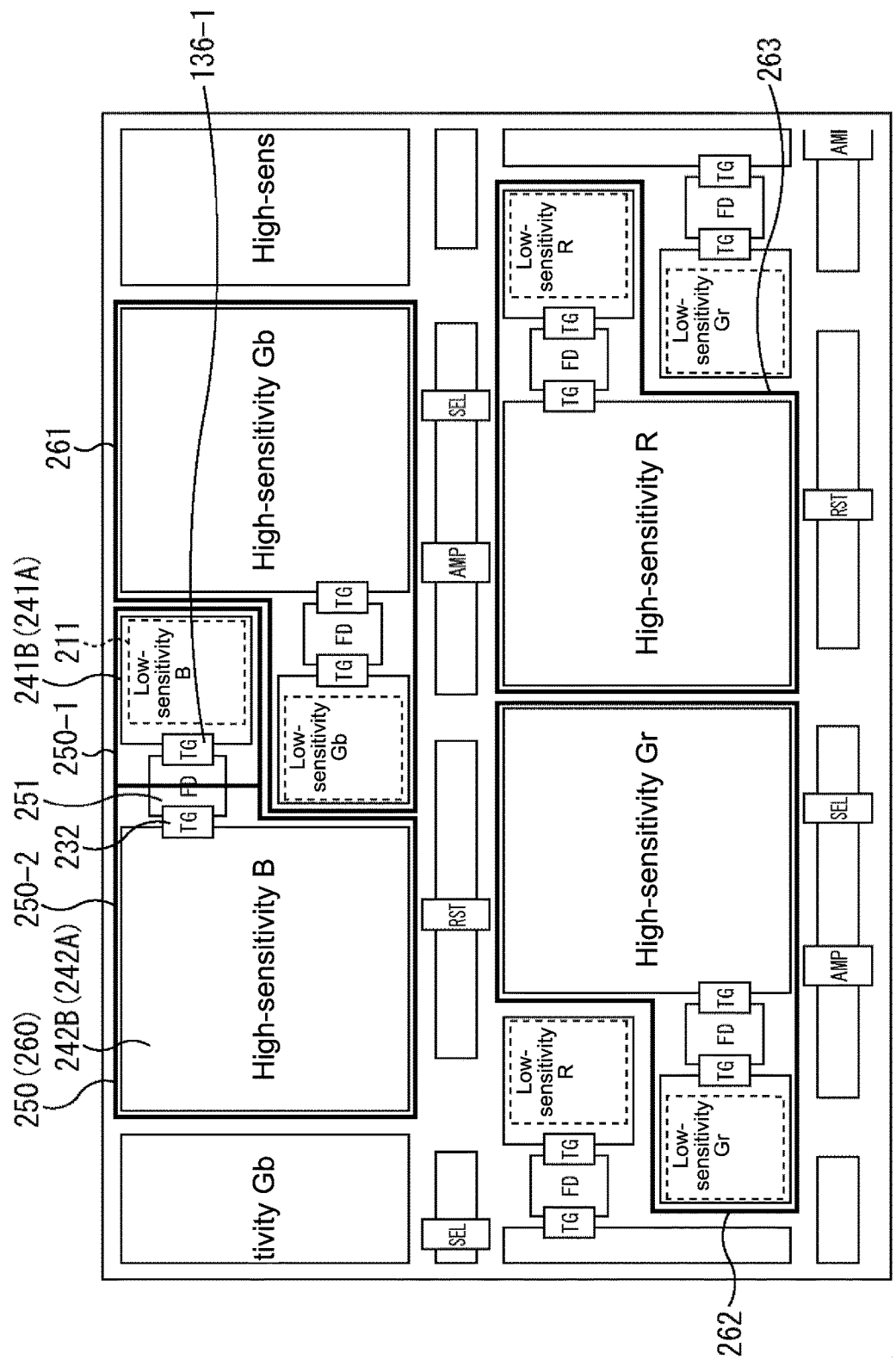
FIG. 11 A plan view showing a modified example of the second structural example of the pixels in the CMOS image sensor according to the second embodiment.

In FIG. 10, the arrangements of the respective sections of the blue pixel 260 and the green pixel 262 on the left-hand side are the same, and the arrangements of the respective sections of the green pixel 261 and the red pixel 263 on the right-hand side are the same. However, as shown in FIG. 11, the arrangements of the respective sections of the green pixels 261 and 262 may be the same. In this case, the arrangements of the respective sections of the blue pixel 260 and the red pixel 263 are the same.

(Third Structural Example of Pixels)

Figure 12:
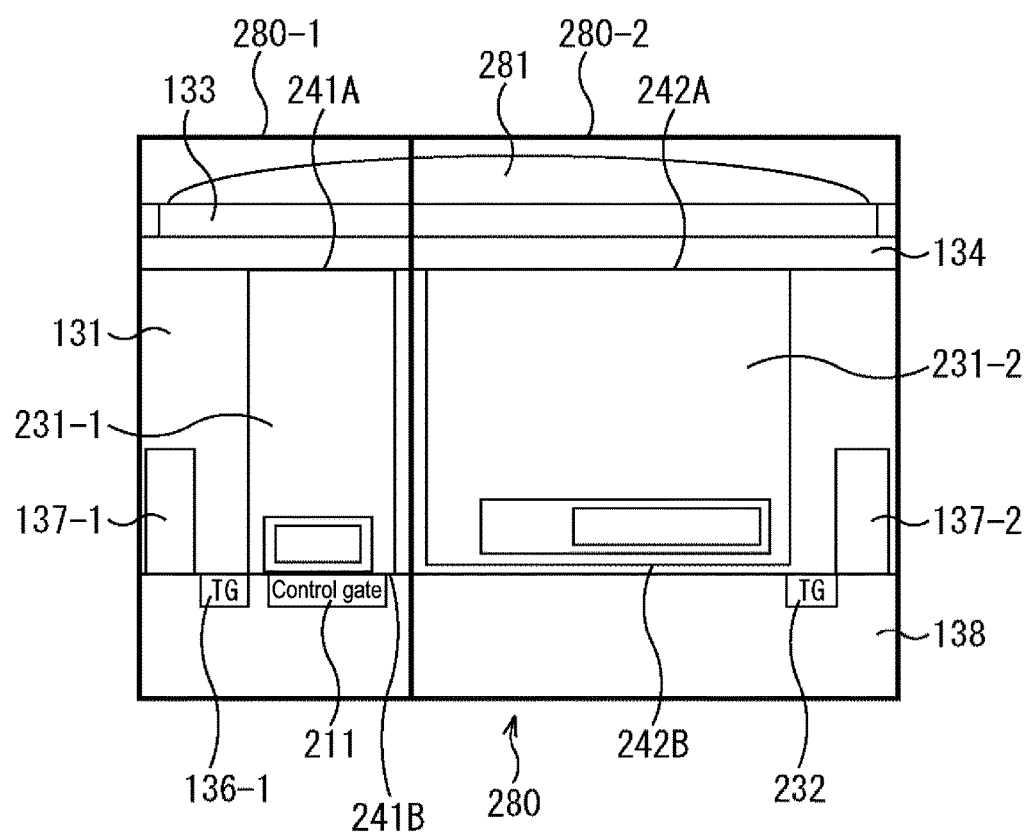
FIG. 12 A cross-sectional diagram showing a third structural example of the CMOS image sensor according to the second embodiment.

FIG. 12 is a cross-sectional diagram showing a third structural example of the pixels of the CMOS image sensor 100 according to the second embodiment.

Of the structures shown in FIG. 12, structures that are the same as those shown in FIG. 9 are denoted by the same symbols, and overlapping descriptions will be omitted as appropriate.

The structure of the pixel 280 shown in FIG. 12 is different from that of the pixel 230 shown in FIG. 9 in that an on-chip lens 281 is provided in place of the on-chip lenses 132-1 and 132-2. In the pixel 280, the on-chip lenses 132-1 and 132-2 within the same pixel 280 are shared.

Specifically, the pixel 280 is constituted of a low-sensitivity pixel 280-1 and a high-sensitivity pixel 280-2. The on-chip lens 281 collects incident light on the photodiodes 231-1 and 231-2 in the semiconductor substrate 131 via the color filter 133 and the flattening film 134.

(Fourth Structural Example of Pixels)

Figures 13, 14:
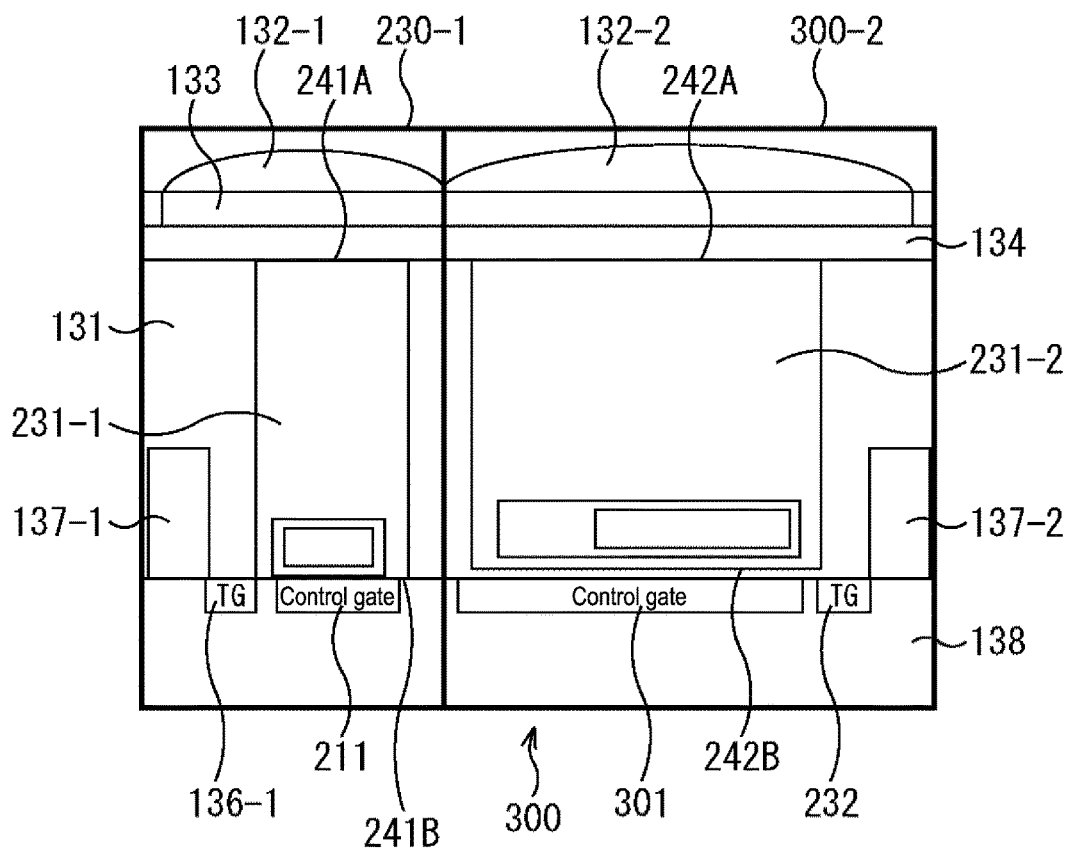
FIG. 13 A cross-sectional diagram showing a fourth structural example of the CMOS image sensor according to the second embodiment.
FIG. 14 A diagram showing an example of the control of the control gate and the trance gate.

FIG. 13 is a cross-sectional diagram showing a fourth structural example of the pixels of the CMOS image sensor 100 according to the second embodiment.

Of the structures shown in FIG. 13, structures that are the same as those shown in FIG. 9 are denoted by the same symbols, and overlapping descriptions will be omitted as appropriate.

The structure of the pixel 300 shown in FIG. 13 is different from that of the pixel 230 shown in FIG. 9 in that a control gate 301 is newly provided. In the pixel 300, the control gate 301 is provided with respect to the photodiode 231-2.

Specifically, the pixel 300 is constituted of the low-sensitivity pixel 230-1 and a high-sensitivity pixel 300-2. The control gate 301 of the high-sensitivity pixel 300-2 is formed on the front surface of the semiconductor substrate 131 opposing the aperture 242B on the front surface side of the photodiode 231-2. The control gate 301 controls the potential of the photodiode 231-2.

As shown in FIG. 14, the control gate 211 is set to a high level when charges are accumulated in the photodiode 231-1 and set to a low level when the charges of the photodiode 231-1 are transferred. The control gate 301 is set to a low level when charges are accumulated in the photodiode 231-1 and when the charges of the photodiode 231-1 are transferred.

Further, the trance gate 136-1 is set to a low level when charges are accumulated in the photodiode 231-1 and is set to a high level when the charges of the photodiode 231-1 are transferred. The trance gate 232 is set to a low level when charges are accumulated in the photodiode 231-2 and is set to a high level when the charges of the photodiode 231-2 are transferred.

With the structures described above, the potential of the photodiode 231-1 at the time charges are accumulated becomes deep, and the number of saturated electrons becomes large. In addition, white spots and dark currents are suppressed in the high-sensitivity pixel 300-2, and image pickup signals at the time of a lower luminance can be output.

Description on Effects of Second Embodiment

Also in the CMOS image sensor 100 according to the second embodiment, the capacity of the photodiode 231-1 of the low-sensitivity pixel 230-1 (250-1, 280-1) is larger than that of the conventional low-sensitivity pixels. Therefore, as in the first embodiment, an effect that the dynamic range described with reference to FIG. 8 is large can be obtained.

Figures 15, 16:
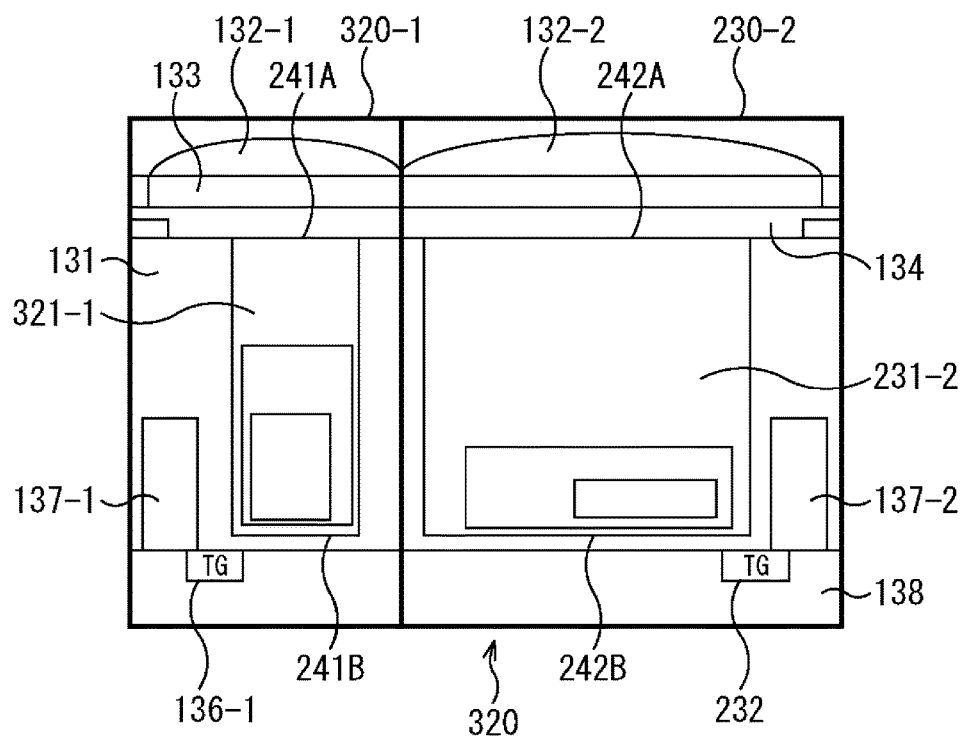
FIG. 15 A diagram for explaining effects of the CMOS image sensor according to the second embodiment.
FIG. 16 A cross-sectional diagram showing a first structural example of pixels in the CMOS image sensor according to a third embodiment.

Further, as shown in FIG. 15, when the control gate for increasing the capacity of the photodiode with respect to the entire pixel is provided in the front-irradiation type CMOS image sensor, the number of saturated electrons increases as compared to the case where no control gate is provided. However, the dark currents and blue sensitivity become a problem.

On the other hand, when the control gate for increasing the capacity of the photodiode with respect to the entire pixel is provided in the back-irradiation type CMOS image sensor, the light incident surface and the surface on which the control gate is formed oppose each other, and thus the blue sensitivity does not become a problem. Moreover, the number of saturated electrons is larger than in the case where no control gate is provided. However, the dark currents become a problem.

In contrast, in the CMOS image sensor 100 according to the second embodiment, the control gate 211 for increasing the capacity of the photodiode is provided only with respect to the low-sensitivity pixel from which image pickup signals are used at the time of a high luminance. Therefore, the dark currents that become a problem at the time of a low luminance do not become a problem. Furthermore, since the CMOS image sensor 100 according to the second embodiment is a back-irradiation type CMOS image sensor, the blue sensitivity also does not become a problem. In addition, the number of saturated electrons is larger than in the case where no control gate is provided.

Third Embodiment (First Structural Example of Pixels of Solid-State Image Pickup Device According to Third Embodiment)

The structure of the CMOS image sensor 100 as the solid-state image pickup device according to a third embodiment to which the present disclosure is applied is the same as that shown in FIG. 1 except for the structure of the pixels 2-dimensionally arranged in the pixel array section 111. Therefore, the descriptions below will be given only on the structure of pixels.

In pixel of the CMOS image sensor 100 according to the third embodiment, the capacity of the photodiode of the low-sensitivity pixel is increased by enhancing an electric field of the low-sensitivity pixel as compared to the high-sensitivity pixel instead of providing a control gate.

FIG. 16 is a cross-sectional diagram showing a first structural example of the pixels in the CMOS image sensor 100 according to the third embodiment.

Of the structures shown in FIG. 16, structures that are the same as those shown in FIG. 9 are denoted by the same symbols, and overlapping descriptions will be omitted as appropriate.

The structure of the pixel 320 shown in FIG. 16 is different from that of the pixel 230 shown in FIG. 9 in that a photodiode 321-1 is provided in place of the photodiode 231-1 and that the control gate 211 is not provided. In the pixel 320, the capacity of the photodiode 321-1 is increased by enhancing the electric field of the photodiode 321-1 of the low-sensitivity pixel 320-1 as compared to that of the photodiode 231-2 of the high-sensitivity pixel 230-2.

Specifically, the pixel 320 is constituted of the low-sensitivity pixel 320-1 and the high-sensitivity pixel 230-2. The photodiode 321-1 of the low-sensitivity pixel 320-1 forms an I shape that extends toward the front surface side of the semiconductor substrate 131 from the back surface side. The photodiode 321-1 is formed such that the electric field becomes stronger than the photodiode 231-2.

The photodiode 321-1 generates and accumulates therein charges in a charge amount corresponding to a light amount of predetermined color light that has entered from the on-chip lens 132-1 via the color filter 133 and the flattening film 134. The charges accumulated in the photodiode 321-1 are transferred to the charge voltage conversion section 137-1 under control of the trance gate 136-1.

(Second Structural Example of Pixels)

Figure 17:
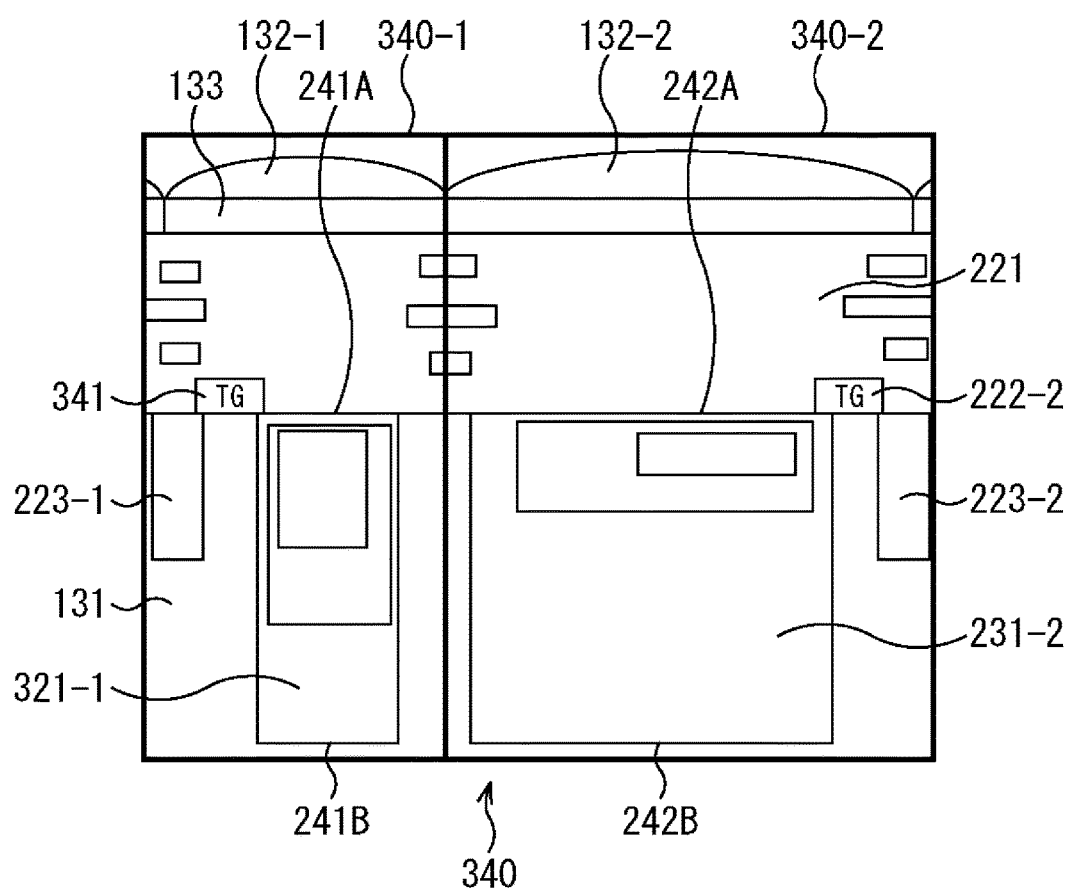
FIG. 17 A cross-sectional diagram showing a second structural example of the pixels in the CMOS image sensor according to the third embodiment.

FIG. 17 is a cross-sectional diagram showing a second structural example of the pixels in the CMOS image sensor 100 according to the third embodiment.

Of the structures shown in FIG. 17, structures that are the same as those shown in FIGS. 7 and 16 are denoted by the same symbols, and overlapping descriptions will be omitted as appropriate.

The pixel 340 shown in FIG. 17 is constituted of a low-sensitivity pixel 340-1 and a high-sensitivity pixel 340-2. In the example shown in FIG. 17, the CMOS image sensor 100 is a front-irradiation type CMOS image sensor. In the pixel 340, the circuit 221 is provided on the light incident side of the semiconductor substrate 131.

Therefore, a trance gate 341 and charge voltage conversion section 223-1 of the low-sensitivity pixel 340-1 are provided on the front surface (surface on circuit 221 side) of the semiconductor substrate 131. In addition, the trance gate 222-2 and charge voltage conversion section 223-2 of the high-sensitivity pixel 340-2 are provided on the front surface of the semiconductor substrate 131.

Description on Effects of Third Embodiment

Also in the CMOS image sensor 100 according to the third embodiment, the capacity of the photodiode 321-1 of the low-sensitivity pixel is larger than that of the conventional low-sensitivity pixels. Therefore, as in the first embodiment, an effect that the dynamic range described with reference to FIG. 8 is large can be obtained.

Structural Example of Fourth Embodiment (Structural Example of Embodiment of Electronic Apparatus)

Figure 18:
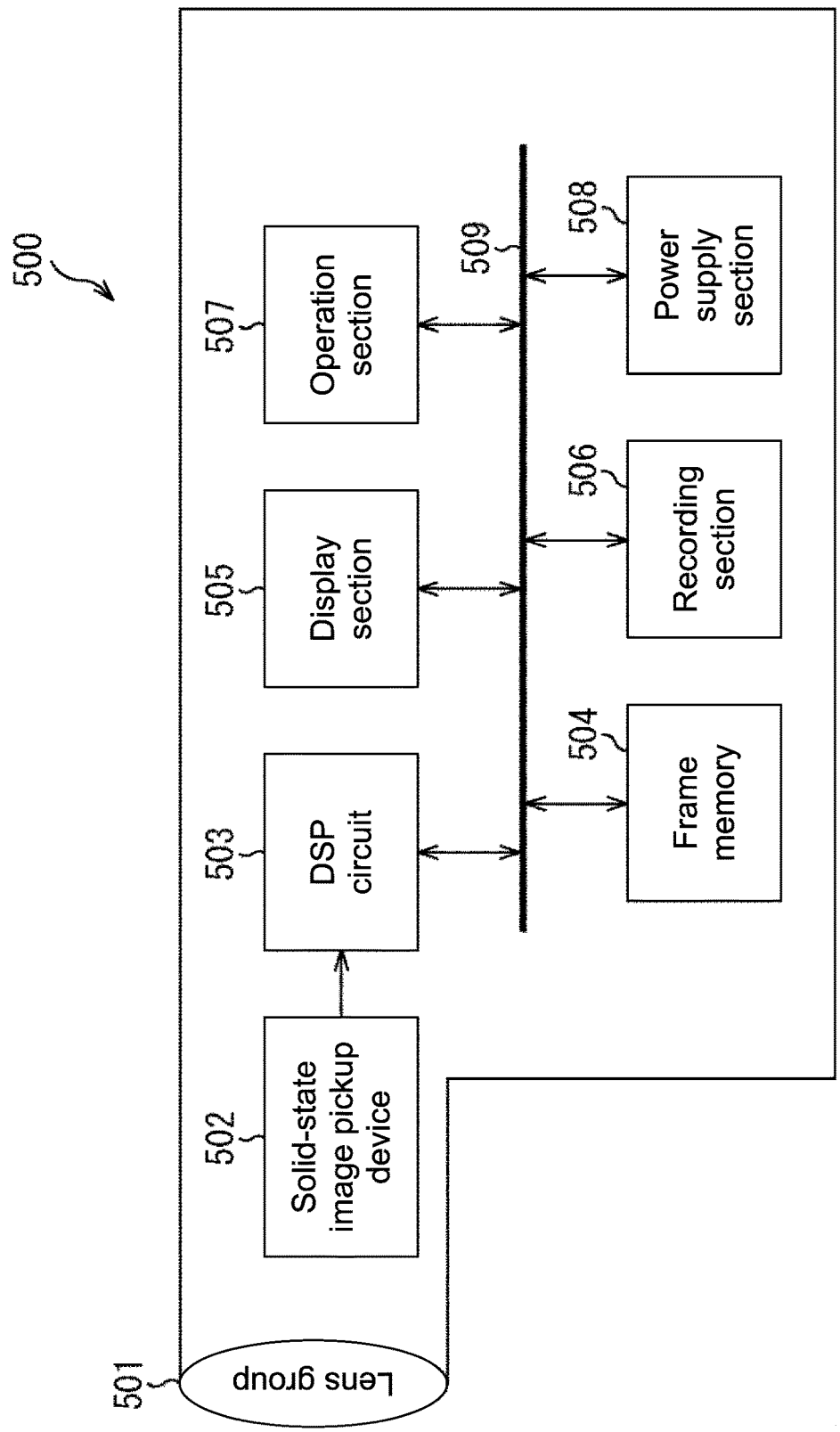
FIG. 18 A block diagram showing a structural example of an image pickup apparatus as an electronic apparatus to which the present disclosure is applied.

FIG. 18 is a block diagram showing a structural example of an image pickup apparatus as an electronic apparatus to which the present disclosure is applied.

The image pickup apparatus 500 shown in FIG. 18 is a video camera, a digital still camera, or the like. The image pickup apparatus 500 is constituted of an optical section 501, a solid-state image pickup device 502, a DSP circuit 503, a frame memory 504, a display section 505, a recording section 506, an operation section 507, and a power supply section 508. The DSP circuit 503, the frame memory 504, the display section 505, the recording section 506, the operation section 507, and the power supply section 508 are mutually connected to one another via a bus line 509.

The optical section 501 is constituted of a lens group or the like and takes in incident light (image pickup light) from an object to image it on an image pickup surface of the solid-state image pickup device 502. The solid-state image pickup device 502 is constituted of the CMOS image sensor according to any of the first to third embodiments described above. The solid-state image pickup device 502 converts a light amount of the incident light imaged on the image pickup surface by the optical section 501 into electric signals in pixel units and supplies them to the DSP circuit 503 as pixel signals.

The DSP circuit 503 carries out predetermined image processing on the pixel signals supplied from the solid-state image pickup device 502 and supplies the image signals subjected to the image processing to the frame memory 504 in a frame unit for the signals to be temporarily stored.

The display section 505 is constituted of, for example, a panel-type display apparatus such as a liquid crystal panel and an organic EL (Electro Luminescence) panel and displays an image based on pixel signals in frame units temporarily stored in the frame memory 504.

The recording section 506 is constituted of a DVD (Digital Versatile Disc), a flash memory, or the like and reads out and records the pixel signals in frame units temporarily stored in the frame memory 504.

The operation section 507 issues operation instructions regarding various functions of the image pickup apparatus 500 based on user operations. The power supply section 508 supplies power to the DSP circuit 503, the frame memory 504, the display section 505, the recording section 506, and the operation section 507 as appropriate.

The electronic apparatus to which the present technique is applied only needs to be an electronic apparatus that uses the solid-state image pickup device in an image capture section, and there are a mobile terminal apparatus including an image pickup function, a copy machine that uses the solid-state image pickup device in an image reading section, and the like in addition to the image pickup apparatus 500.

It should be noted that a structure in which the CMOS image sensor is formed as one chip may be adopted, or a module-type structure including an image pickup function, that is packaged with an optical section and the like, may be adopted.

Furthermore, the embodiment of the present disclosure is not limited to the embodiments described above and can be variously modified without departing from the gist of the present disclosure.

For example, the on-chip lens 132-1 does not need to be provided. Moreover, image pickup signals in pixel units may be generated using the image pickup signals of the high-sensitivity pixels and the image pickup signals of the low-sensitivity pixels at the time of a low luminance.

The present disclosure may also take the following structures.

(1) A solid-state image pickup device, including:

pixels each including a high-sensitivity pixel and a low-sensitivity pixel having a lower sensitivity than the high-sensitivity pixel; and a low-sensitivity pixel control gate configured to control a potential of a photoelectric conversion device of the low-sensitivity pixel.

(2) The solid-state image pickup device according to (1) above, in which the low-sensitivity pixel control gate becomes a high level when charges are accumulated in the photoelectric conversion device of the low-sensitivity pixel and becomes a low level when the charges are transferred.

(3) The solid-state image pickup device according to (1) or (2) above, in which the low-sensitivity pixel control gate is formed on the other side of a light-incident side of the photoelectric conversion device of the low-sensitivity pixel.

(4) The solid-state image pickup device according to any one of (1) to (3) above, further including a charge voltage conversion section configured to convert charges accumulated in the photoelectric conversion device of the low-sensitivity pixel into a voltage and converts charges accumulated in a photoelectric conversion device of the high-sensitivity pixel into a voltage.

(5) The solid-state image pickup device according to (4) above, in which the pixels are arranged in a Bayer arrangement, in which the arrangements of the high-sensitivity pixel, the low-sensitivity pixel, and the charge voltage conversion section are the same for the pixels of a green color, and in which the arrangements of the high-sensitivity pixel, the low-sensitivity pixel, and the charge voltage conversion section are the same for the pixels of a red color and the pixels of a blue color.

(6) The solid-state image pickup device according to any one of (1) to (5) above, further including a lens configured to collect light onto a photoelectric conversion device of the high-sensitivity pixel and the photoelectric conversion device of the low-sensitivity pixel.

(7) The solid-state image pickup device according to any one of (1) to (6) above, further including a high-sensitivity pixel control gate configured to control a potential of a photoelectric conversion device of the high-sensitivity pixel, in which the high-sensitivity pixel control gate is set to a low level when charges are accumulated in the photoelectric conversion device of the high-sensitivity pixel and when the charges are transferred.

(8) An electronic apparatus, including:

pixels each including a high-sensitivity pixel and a low-sensitivity pixel having a lower sensitivity than the high-sensitivity pixel; and a low-sensitivity pixel control gate configured to control a potential of a photoelectric conversion device of the low-sensitivity pixel.

(9) A solid-state image pickup device, including pixels each including a high-sensitivity pixel and a low-sensitivity pixel having a lower sensitivity than the high-sensitivity pixel, a potential deep section of a photoelectric conversion device of the low-sensitivity pixel extending in a horizontal direction outside a photoelectric conversion device of the high-sensitivity pixel.

(10) The solid-state image pickup device according to (9) above,
in which the pixels are a plurality of pixels,
the solid-state image pickup device further including
a charge voltage conversion section configured to convert charges accumulated in the photoelectric conversion device of the low-sensitivity pixel of a first pixel out of the plurality of pixels into a voltage and converts charges accumulated in the photoelectric conversion device of the high-sensitivity pixel of a second pixel adjacent to the first pixel into a voltage.

(11) The solid-state image pickup device according to (10) above, further including
a circuit that is formed on the other side of a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

(12) The solid-state image pickup device according to (10) above, further including
a circuit that is formed on a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

(13) The solid-state image pickup device according to any one of (9) to (11) above,
in which the photoelectric conversion device of the high-sensitivity pixel partially extends toward the outside.

(14) The solid-state image pickup device according to any one of (9) to (13) above, further including
a low-sensitivity pixel control gate configured to control a potential of the photoelectric conversion device of the low-sensitivity pixel.

(15) The solid-state image pickup device according to (14),
in which the low-sensitivity pixel control gate becomes a high level when charges are accumulated in the photoelectric conversion device of the low-sensitivity pixel and becomes a low level when the charges are transferred.

(16) An electronic apparatus, including
pixels each including a high-sensitivity pixel and a low-sensitivity pixel having a lower sensitivity than the high-sensitivity pixel,
a potential deep section of a photoelectric conversion device of the low-sensitivity pixel extending in a horizontal direction outside a photoelectric conversion device of the high-sensitivity pixel.

(17) A solid-state image pickup device, including
pixels each including a high-sensitivity pixel and a low-sensitivity pixel having a lower sensitivity than the high-sensitivity pixel,
an electric field of the photoelectric conversion device of the low-sensitivity pixel being stronger than that of the photoelectric conversion device of the high-sensitivity pixel.

(18) The solid-state image pickup device according to (17) above, further including:
a charge voltage conversion section configured to convert charges accumulated in the photoelectric conversion device of the low-sensitivity pixel into a voltage; and
a circuit that is formed on the other side of a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

(19) The solid-state image pickup device according to (17) above, further including:
a charge voltage conversion section configured to convert charges accumulated in the photoelectric conversion device of the low-sensitivity pixel into a voltage; and
a circuit that is formed on a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

(20) An electronic apparatus, including
pixels each including a high-sensitivity pixel and a low-sensitivity pixel having a lower sensitivity than the high-sensitivity pixel,
an electric field of the photoelectric conversion device of the low-sensitivity pixel being stronger than that of the photoelectric conversion device of the high-sensitivity pixel.

DESCRIPTION OF SYMBOLS

130 Pixel
130-1 low-sensitivity pixel
130-2 high-sensitivity pixel
135-1 photodiode
137-1 charge voltage conversion section
138 circuit
160 pixel
160-1 low-sensitivity pixel
160-2 high-sensitivity pixel
161-1, 161-2 charge voltage conversion section
170 pixel
170-1 low-sensitivity pixel
170-2 high-sensitivity pixel
190 pixel
190-2 high-sensitivity pixel
191 photodiode
210 pixel
210-1 low-sensitivity pixel
211 control gate
220 pixel
220-1 low-sensitivity pixel
220-2 high-sensitivity pixel
221 circuit
223-1 charge voltage conversion section
230 pixel
230-1 low-sensitivity pixel
230-2 high-sensitivity pixel
250 pixel
250-1 low-sensitivity pixel
250-2 high-sensitivity pixel
251 charge voltage conversion section
260 blue pixel
261, 262 green pixel
263 red pixel
280 pixel
280-1 low-sensitivity pixel
280-2 high-sensitivity pixel
281 on-chip lens
300 pixel
300-2 high-sensitivity pixel
301 control gate
320 pixel 320-1 low-sensitivity pixel
321-1 photodiode
500 image pickup apparatus

What is claimed is:

1. A solid-state image pickup device, comprising:
   a plurality of pixels, wherein each pixel includes a high-sensitivity pixel and a low-sensitivity pixel having a lower sensitivity than the high-sensitivity pixel;
   a low-sensitivity pixel control gate configured to control a potential of a photoelectric conversion device of the low-sensitivity pixel; and
   a high-sensitivity pixel control gate configured to control a potential of a photoelectric conversion device of the high-sensitivity pixel,
   wherein the high-sensitivity pixel control gate is set to a low level when charges are accumulated in the photoelectric conversion device of the high-sensitivity pixel and when the charges are transferred.

2. The solid-state image pickup device according to claim 1, wherein the low-sensitivity pixel control gate becomes a high level when charges are accumulated in the photoelectric conversion device of the low-sensitivity pixel and becomes a low level when the charges are transferred.

3. The solid-state image pickup device according to claim 1, wherein the low-sensitivity pixel control gate is formed on side opposite a light-incident side of the photoelectric conversion device of the low-sensitivity pixel.

4. The solid-state image pickup device according to claim 1, further comprising a charge voltage conversion section configured to convert charges accumulated in the photoelectric conversion device of the low-sensitivity pixel into a voltage and to convert charges accumulated in a photoelectric conversion device of the high-sensitivity pixel into a voltage.

5. The solid-state image pickup device according to claim 4,
   wherein the pixels are arranged in a Bayer arrangement,
   wherein an arrangement of the high-sensitivity pixel, the low-sensitivity pixel, and the charge voltage conversion section are the same for the pixels of a green color, and
   wherein an arrangement of the high-sensitivity pixel, the low-sensitivity pixel, and the charge voltage conversion section are the same for the pixels of a red color and the pixels of a blue color.

6. The solid-state image pickup device according to claim 1, further comprising a lens configured to collect light onto a photoelectric conversion device of the high-sensitivity pixel and the photoelectric conversion device of the low-sensitivity pixel.

7. An electronic apparatus, comprising:
   a plurality of pixels, wherein each pixel in the plurality of pixels includes a high-sensitivity pixel and a low-sensitivity pixel having a lower sensitivity than the high-sensitivity pixel;
   a low-sensitivity pixel control gate configured to control a potential of a photoelectric conversion device of the low-sensitivity pixel; and
   a high-sensitivity pixel control gate configured to control a potential of a photoelectric conversion device of the high-sensitivity pixel,
   wherein the high-sensitivity pixel control gate is set to a low level when charges are accumulated in the photoelectric conversion device of the high-sensitivity pixel and when the charges are transferred.

8. A solid-state image pickup device, comprising:
   a plurality of pixels, wherein each pixel in the plurality of pixels includes a high-sensitivity pixel and a low-sensitivity pixel having a lower sensitivity than the high-sensitivity pixel;
   a low-sensitivity pixel control gate configured to control a potential of a photoelectric conversion device of the low-sensitivity pixel;
   a high-sensitivity pixel control gate configured to control a potential of a photoelectric conversion device of the high-sensitivity pixel,
   wherein the high-sensitivity pixel control gate is set to a low level when charges are accumulated in the photoelectric conversion device of the high-sensitivity pixel and when the charges are transferred; and
   a potential deep section of a photoelectric conversion device of the low-sensitivity pixel extending in a horizontal direction outside a photoelectric conversion device of the high-sensitivity pixel.

9. The solid-state image pickup device according to claim 8,
   further comprising
   a charge voltage conversion section configured to convert charges accumulated in the photoelectric conversion device of the low-sensitivity pixel of a first pixel out of the plurality of pixels into a voltage and to convert charges accumulated in the photoelectric conversion device of the high-sensitivity pixel of a second pixel adjacent to the first pixel into a voltage.

10. The solid-state image pickup device according to claim 9, further comprising a circuit that is formed on a side opposite a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

11. The solid-state image pickup device according to claim 9, further comprising
    a circuit that is formed on a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

12. The solid-state image pickup device according to claim 8, wherein the photoelectric conversion device of the high-sensitivity pixel partially extends toward a front surface of a substrate.

13. The solid-state image pickup device according to claim 8, wherein the low-sensitivity pixel control gate becomes a high level when charges are accumulated in the photoelectric conversion device of the low-sensitivity pixel and becomes a low level when the charges are transferred.

14. An electronic apparatus, comprising:
    a plurality of pixels, wherein each pixel in the plurality of pixels includes a high-sensitivity pixel and a low-sensitivity pixel having a lower sensitivity than the high-sensitivity pixel;
    a low-sensitivity pixel control gate configured to control a potential of a photoelectric conversion device of the low-sensitivity pixel;
    a high-sensitivity pixel control gate configured to control a potential of a photoelectric conversion device of the high-sensitivity pixel,
    wherein the high-sensitivity pixel control gate is set to a low level when charges are accumulated in the photoelectric conversion device of the high-sensitivity pixel and when the charges are transferred; and a potential deep section of a photoelectric conversion device of the low-sensitivity pixel extending in a horizontal direction outside a photoelectric conversion device of the high-sensitivity pixel.

15. A solid-state image pickup device, comprising:

a plurality of pixels, each including a high-sensitivity pixel and a low-sensitivity pixel having a lower sensitivity than the high-sensitivity pixel;

a low-sensitivity pixel control gate configured to control a potential of a photoelectric conversion device of the low-sensitivity pixel, a high-sensitivity pixel control gate configured to control a potential of a photoelectric conversion device of the high-sensitivity pixel, wherein the high-sensitivity pixel control gate is set to a low level when charges are accumulated in the photoelectric conversion device of the high-sensitivity pixel and when the charges are transferred, and an electric field of the photoelectric conversion device of the low-sensitivity pixel being stronger than that of the photoelectric conversion device of the high-sensitivity pixel.

16. The solid-state image pickup device according to claim 15, further comprising:

a charge voltage conversion section configured to convert charges accumulated in the photoelectric conversion device of the low-sensitivity pixel into a voltage; and a circuit that is formed on a side opposite a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

17. The solid-state image pickup device according to claim 15, further comprising:

a charge voltage conversion section configured to convert charges accumulated in the photoelectric conversion device of the low-sensitivity pixel into a voltage; and a circuit that is formed on a light-incident side of the photoelectric conversion device of the high-sensitivity pixel and the photoelectric conversion device of the low-sensitivity pixel and configured to read out an image pickup signal as a voltage signal obtained by the conversion of the charge voltage conversion section.

18. An electronic apparatus, comprising:

a plurality of pixels, wherein each pixel in the plurality of pixels includes a high-sensitivity pixel and a low-sensitivity pixel having a lower sensitivity than the high-sensitivity pixel;

a low-sensitivity pixel control gate configured to control a potential of a photoelectric conversion device of the low-sensitivity pixel;

a high-sensitivity pixel control gate configured to control a potential of a photoelectric conversion device of the high-sensitivity pixel, wherein the high-sensitivity pixel control gate is set to a low level when charges are accumulated in the photoelectric conversion device of the high-sensitivity pixel and when the charges are transferred; and an electric field of the photoelectric conversion device of the low-sensitivity pixel being stronger than that of the photoelectric conversion device of the high-sensitivity pixel.

* * * * *